United States Patent
Murata et al.

(10) Patent No.: US 6,298,294 B1
(45) Date of Patent: Oct. 2, 2001

(54) DEVICE FOR CONTROLLING SUSPENSION SHOCK ABSORBERS OF VEHICLES BASED UPON PHANTOM SUBSTITUTE THEREFOR

(75) Inventors: Masahiro Murata, Nisshin; Satoshi Suzuki, Mishima; Koichi Tomida, Toyota; Toshio Onuma, Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/595,049

(22) Filed: Jun. 14, 2000

(30) Foreign Application Priority Data

| Jun. 22, 1999 | (JP) | 11-175401 |
| Jun. 22, 1999 | (JP) | 11-175421 |
| Jul. 6, 1999 | (JP) | 11-192225 |
| Jul. 15, 1999 | (JP) | 11-201623 |

(51) Int. Cl.⁷ .............................. G06F 17/00; G06F 7/00
(52) U.S. Cl. .................. 701/37; 701/38; 280/5.512; 280/5.515; 188/266.1
(58) Field of Search .................. 701/37, 38, 39; 188/299.1, 266.1; 280/5.512, 5.515

(56) References Cited

U.S. PATENT DOCUMENTS

| 5,440,488 | * | 8/1995 | Yamaoka et al. | 701/37 |
| 5,802,486 | * | 9/1998 | Uchiyama | 701/37 |
| 5,810,384 | * | 9/1998 | Iwasaki et al. | 280/5.515 |
| 5,944,153 | * | 8/1999 | Ichimaru | 188/299.1 |
| 5,950,776 | * | 9/1999 | Iwasaki et al. | 701/37 |

FOREIGN PATENT DOCUMENTS

| A-7-125518 | 5/1995 | (JP) . |
| A-9-309316 | 12/1997 | (JP) . |
| A-11-268512 | 10/1999 | (JP) . |

* cited by examiner

Primary Examiner—William A. Cuchlinski, Jr.
Assistant Examiner—Gertrude Arthur
(74) Attorney, Agent, or Firm—Oliff & Berridge, PLC

(57) ABSTRACT

A device for controlling damping coefficients of shock absorbers (22FL, 22FR, 22RL, 22RR) of a four wheeled vehicle constructs a phantom damping system composed of a phantom side shock absorber (122, 122F, 122R) disposed vertically at a lateral inside of a turn running of the vehicle to have a lower end movable along a ground surface together with the vehicle and an upper end vertically movable relative to the lower end with a first phantom damping coefficient (Cg, Cgf, Cgr) therebetween, and a phantom angular shock absorber (124, 124F, 124R) arranged to act between the upper end of the phantom side shock absorber and the vehicle body with a second phantom damping coefficient (Ca, Caf, Car) therebetween, whereby, when the damping coefficients of the shock absorbers are controlled to substantially equalize the phantom damping system with the actual damping system of the actual shock absorbers with respect to damping vertical and rolling movements of the vehicle body, the mass center of the vehicle body is lowered according to a rolling thereof during a turn running of the vehicle, as the vehicle body rolls around the upper end of the phantom side shock absorber located laterally inside of the turn running.

32 Claims, 20 Drawing Sheets

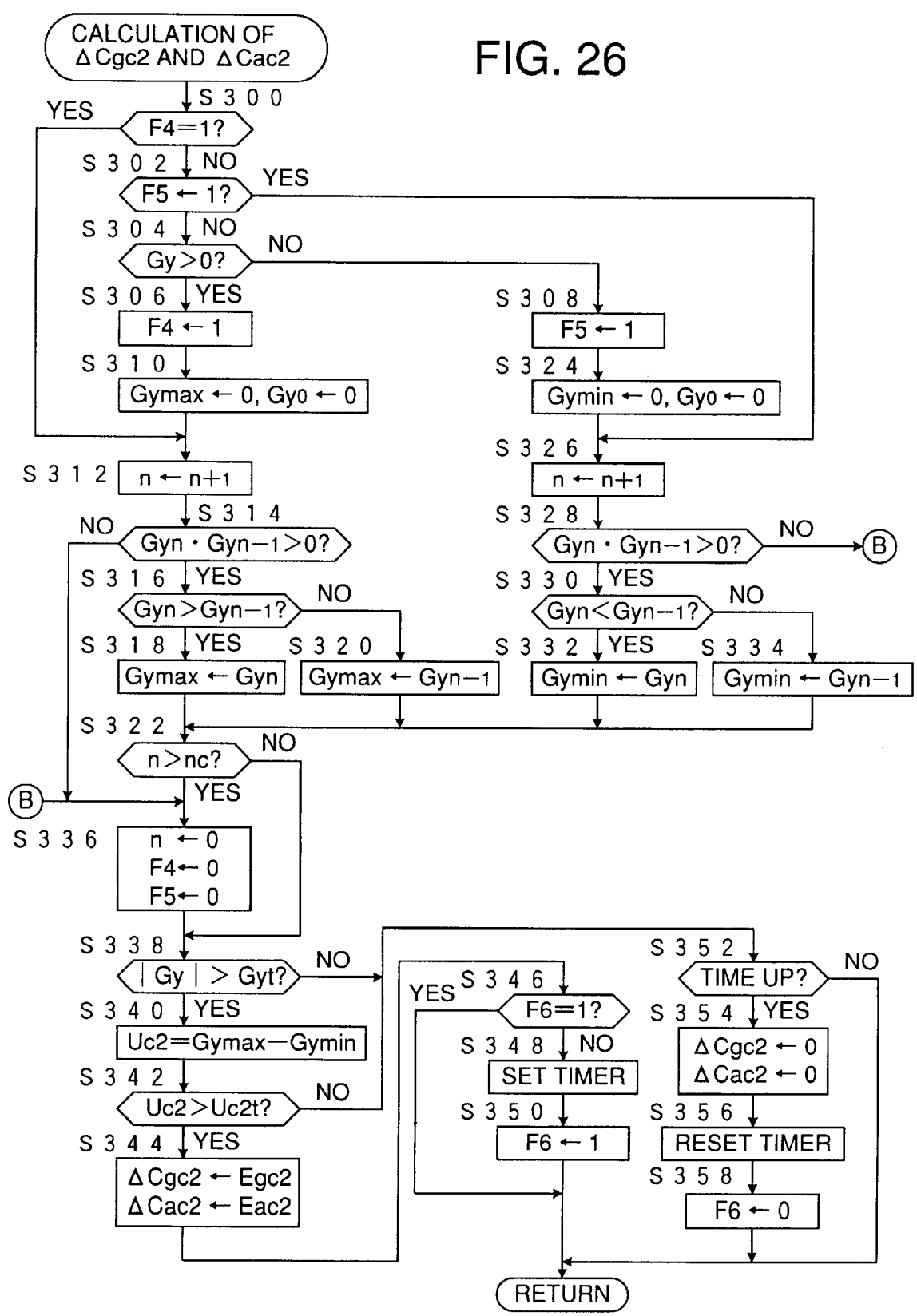

DEVICE FOR CONTROLLING SUSPENSION SHOCK ABSORBERS OF VEHICLES BASED UPON PHANTOM SUBSTITUTE THEREFOR

BACKGROUND OF THE INVENTION

1. Field of the Invention

The present invention relates to the art of vehicle suspension, and more particularly, to a device for controlling the damping coefficients of shock absorbers provided between a body of a four wheeled vehicle and the wheels thereof by constructing a phantom damping system substantially equivalent to the damping system provided by the actual shock absorbers.

2. Description of the Prior Art

In the art of the vehicle suspension, it is already known to variably control the damping coefficients of the shock absorbers incorporated therein so that a more desirable suspension performance is available.

For example, when the damping coefficient of a shock absorber disposed in parallel with a suspension spring supporting the vehicle body at a corresponding portion thereof on a wheel is variably controlled to be proportional to a ratio of the vertically stroking velocity of the corresponding body portion to the difference between the vertically stroking velocity of the corresponding body portion and the vertically stroking velocity of the wheel, the shock absorber can be imagined as acting between the vehicle body and a phantom stationary overhead construction, as generally called "sky hook damper".

If the shock absorber for the vehicle body could act against a stationary overhead construction, the stability performance of the vehicle body would of course be much improved, because the end of the shock absorber opposite to the vehicle body would no longer fluctuate as it actually does together with the wheel along the road surface in the actual construction.

SUMMARY OF THE INVENTION

On the other hand, when the four wheeled vehicles turn, the vehicles would become more stable against the turn and a rolling due to the turn if the mass center or the center of gravity of the vehicle body could be lowered.

In view of the above, it is a primary object of the present invention to provide a device for controlling the damping coefficients of those shock absorbers mounted in the suspension of a four wheeled vehicle in such an ordinary arrangement that each acts between each wheel and a corresponding portion of the vehicle body in parallel with a corresponding suspension spring, so that the center of gravity of the vehicle body is lowered during a turn running according to the art of constructing a phantom damping system by the actual shock absorbers.

According to the present invention, such a primary object is accomplished by a device for controlling damping coefficients of shock absorbers of a four wheeled vehicle having a vehicle body, front left, front right, rear left and rear right wheels each supporting the vehicle body at a corresponding portion thereof, and the shock absorbers each acting between each of the wheels and the corresponding portion of the vehicle body, comprising:

means for constructing a phantom damping system composed of a phantom side shock absorber disposed vertically at a lateral inside of a turn running of the vehicle to have a lower end movable along a ground surface together with the vehicle and an upper end vertically movable relative to the lower end with a first phantom damping coefficient therebetween, and a phantom angular shock absorber arranged to act between the upper end of the phantom side shock absorber and the vehicle body with a second phantom damping coefficient therebetween, such that the phantom damping system provides the vehicle body with a substantially same phantom vertical damping force against a vertical movement of the vehicle body and a substantially same phantom angular damping moment against a rolling angular movement of the vehicle body as the shock absorbers acting between the wheels and the corresponding portions of the vehicle body during a rolling of the vehicle body due to the turn running of the vehicle;

means for calculating values of at least the first and second phantom damping coefficients for obtaining an optimum rolling performance of the vehicle body by the phantom damping system during the turn running of the vehicle; and means for controlling the damping coefficients of the shock absorbers acting between the wheels and the corresponding portions of the vehicle body based upon the calculated values of the first and second phantom damping coefficients.

When the phantom damping system is so constructed as described above, the vehicle body will be provided with a substantially same damping effect by the phantom side and angular shock absorbers as that provided by the shock absorbers acting between the wheels and the corresponding portions of the vehicle body against a vertical movement as well as against a rolling movement due to a turn running of the vehicle.

Further, in the rolling of the vehicle body damped by the shock absorbers acting between the wheels and the corresponding portions of the vehicle body, the vehicle body will roll around a roll center generally vertically aligned with the mass center of the vehicle body and substantially maintained at a constant height, because the vertical forces generated in the left side and the right side of the suspension system by a rolling of the vehicle body will generally balance in the vertical direction.

However, the vehicle body damped by the above-mentioned phantom damping system rolls around the pivot point of the phantom angular shock absorber connected with the upper end of the phantom side shock absorber positioned at the lateral inside of the turn running of the vehicle. As will be appreciated from the detailed descriptions made hereinbelow, the condition that the vertically disposed phantom side shock absorber, and therefore the upper end thereof, is positioned at the lateral inside of the turn running of the vehicle means that a vertically disposed central axis of the phantom side shock absorber is positioned at a concave side of a phantom curved trace drawn by the center of gravity or the mass center of the vehicle body of the turn running vehicle. Therefore, the mass center of the vehicle body damped by the above-mentioned phantom damping system lowers according to a rolling thereof due to a turn running of the vehicle.

The basic principle of the damping coefficient control according to the present invention will be described with reference to FIGS. 1 and 2.

Referring to FIG. 1 showing a standard skeleton model of the suspension system of a four wheeled vehicle from a back thereof, a vehicle body 110 is supported by left and right wheels 112L and 112R via a pair of parallel combinations of left and right suspension springs 114L and 114R and left and right shock absorbers 116L and 116R, respectively. The shock absorbers 116L and 116R correspond to a pair of shock absorbers 22FL and 22FR or a pair of shock absorbers 22RL and 22RR described hereinbelow with reference to FIG. 4, and are each of a variable type in which its damping coefficient is variably controllable by a control signal supplied from a controller such as electric control means 24 of FIG. 4. 118 is the center of gravity or mass center of the vehicle body 110. It is herein assumed that the vehicle is making a left turn, so that the left side of the vehicle is an inside of the turn, while the right side of the vehicle is an outside of the turn.

The roll motion of the vehicle body supported by such a suspension system is expressed with regard to a movement in the vertical direction and a rotation around the mass center 118 as follows:

$$M\left(\frac{\ddot{X}in + \ddot{X}out}{2}\right) = KXin + KXout + Cin\dot{X}in + Cout\dot{X}out \tag{1}$$

$$I\ddot{\Psi} = \frac{W}{2}KXin - \frac{W}{2}KXout + \frac{W}{2}Cin\dot{X}in - \frac{W}{2}Cout\dot{X}out \tag{2}$$

wherein M and I are the mass and the inertial moment of the vehicle body 110 around the mass center 118 thereof, respectively, Xin and Xout are vertical shiftings of inside (left side) and outside (right side) portions of the vehicle body vertically above the inside and outside wheels 112L and 112R relative thereto, respectively, to be positive toward downward, $\Psi$ is a roll angle of the vehicle body around the mass center 118 to be positive in the counter-clockwise direction as viewed in FIG. 1, K is a spring constant common to the inside and outside springs 114L and 114R, Cin and Cout are damping coefficients of the inside and outside shock absorbers 116L and 116R, respectively, and W is the wheel tread.

FIG. 2 is a skeleton model similar to FIG. 1, showing a vehicle suspension system incorporating a phantom side shock absorber 122 and a phantom angular shock absorber 124 instead of the left side and right side shock absorbers 116L and 116R shown in FIG. 1. The lower end of the phantom side shock absorber 122 is assumed to move along the ground surface in parallel with the wheels 112L and 112R by a phantom side wheel 120. In FIG. 2, the other portions corresponding to those shown in FIG. 1 are designated by the same reference numerals as in FIG. 1 and are assumed to operate in the same manner as in FIG. 1.

The motions of such a suspension system with regard to a vertical movement and a rotation around the mass center 118 are expressed as follows:

$$M\left(\frac{\ddot{X}in + \ddot{X}out}{2}\right) = \tag{3}$$
$$KXin + KXout + \left(\frac{LCg}{W} + \frac{Cg}{2}\right)\dot{X}in + \left(-\frac{LCg}{W} + \frac{Cg}{2}\right)\dot{X}out$$

$$I\ddot{\Psi} = \frac{W}{2}KXin - \frac{W}{2}KXout + \left(\frac{LCg}{W} + \frac{Cg}{2}\right)\dot{X}inL + \tag{4}$$
$$\left(-\frac{LCg}{W} + \frac{Cg}{2}\right)\dot{X}outL + \frac{W}{2}Ca\dot{X}in - \frac{W}{2}Ca\dot{X}out$$

wherein, in addition to those defined for equations 1 and 2, Cg and Ca are damping coefficients of the phantom side and angular shock absorbers 122 and 124, respectively, and L is a lateral distance of the phantom side shock absorber 122 from the mass center 118.

By denoting WCa/2 as Cn, equation 4 is rewritten as follows:

$$I\ddot{\Psi} = \frac{W}{2}KXin - \frac{W}{2}KXout + \left(\frac{LCg}{W} + \frac{Cg}{2}\right)\dot{X}inL + \tag{5}$$
$$\left(-\frac{LCg}{W} + \frac{Cg}{2}\right)\dot{X}outL + Cn(\dot{X}in - \dot{X}out)$$

Therefore, if such conditions as set out below in equations 6 and 7 are ensured, the suspension system of FIG. 1 will operate to be substantially equivalent to that of FIG. 2 with respect to vertical and rolling movements of the vehicle body:

$$\left(\frac{LCg}{W} + \frac{Cg}{2}\right)\dot{X}in + \left(-\frac{LCg}{W} + \frac{Cg}{2}\right)\dot{X}out = Cin\dot{X}in + Cout\dot{X}out \tag{6}$$

$$\left(\frac{LCg}{W} + \frac{Cg}{2}\right)\dot{X}inL + \left(-\frac{LCg}{W} + \frac{Cg}{2}\right)\dot{X}outL + Cn(\dot{X}in - \dot{X}out) = \tag{7}$$
$$\frac{W}{2}Cin\dot{X}in - \frac{W}{2}Cout\dot{X}out$$

By denoting Cn/L as Cm, equation 7 is further rewritten as follows:

$$\left(\frac{LCg}{W} + \frac{Cg}{2}\right)\dot{X}in + \left(-\frac{LCg}{W} + \frac{Cg}{2}\right)\dot{X}out + Cm(\dot{X}in - \dot{X}out) = \tag{8}$$
$$\frac{W}{2L}Cin\dot{X}in - \frac{W}{2L}Cout\dot{X}out$$

By denoting T as follows, $$\left(\frac{LCg}{W} + \frac{Cg}{2}\right)\dot{X}in + \left(-\frac{LCg}{W} + \frac{Cg}{2}\right)\dot{X}out = T \tag{9}$$

equations 6 and 8 are rewritten as follow:

$$T = Cin\dot{X}in + Cout\dot{X}out \tag{10}$$

$$T + Cm(\dot{X}in - \dot{X}out) = \frac{W}{2L}Cin\dot{X}in - \frac{W}{2L}Cout\dot{X}out \tag{11}$$

Equation 11 is further rewritten as follows:

$$\frac{2TL}{W} + \frac{2L}{W}Cm(\dot{X}in - \dot{X}out) = Cin\dot{X}in + Cout\dot{X} \tag{12}$$

By adding equations 10 and 12 with one another, the following equation is obtained:

$$T + \frac{2TL}{W} + \frac{2L}{W}Cm(\dot{X}in - \dot{X}out) = 2Cin\dot{X}in \tag{13}$$

Since Cm=Cn/L and Cn=WCa/2, equation 13 is rewritten as follows:

$$T + \frac{2TL}{W} + Ca(\dot{X}in - \dot{X}out) = 2Cin\dot{X}in \tag{14}$$

Therefore, the damping coefficient Cin of the inside shock absorber 116L to let the suspension system of FIG. 1 operate to be equivalent to that of FIG. 2 is obtained as follows:

$$Cin = \left\{T + \frac{2TL}{W} + Ca(\dot{X}in - \dot{X}out)\right\} / 2\dot{X}in \tag{15}$$

$$= \left(\frac{T}{2} + \frac{TL}{W}\right) / \dot{X}in + \frac{Ca}{2}\left(1 - \frac{\dot{X}out}{\dot{X}in}\right)$$

$$= \frac{T}{2W}(W + 2L) / \dot{X}in + \frac{Ca}{2}\left(1 - \frac{\dot{X}out}{\dot{X}in}\right)$$

Further, by substituting Cin of equation 15 for that of equation 10, the damping coefficient Cout of the outside shock absorber 116L to let the suspension system of FIG. 1 operate to be equivalent to that of FIG. 2 is obtained as follows:

$$T = \frac{T}{2W}(W + 2L) + \frac{Ca}{2}(\dot{X}in - \dot{X}out) + Cout\dot{X}out \tag{16}$$

$$Cout\dot{X}out = T - \frac{T}{2W}(W + 2L) - \frac{Ca}{2}(\dot{X}in - \dot{X}out) \tag{17}$$

$$= \frac{T}{2W}(2W - W - 2L) - \frac{Ca}{2}(\dot{X}in - \dot{X}out)$$

$$Cout = \frac{T}{2W}(W - 2L) / \dot{X}out - \frac{Ca}{2}\left(\frac{\dot{X}in}{\dot{X}out} - 1\right) \tag{18}$$

The formulae of Cin and Cout by equations 15 and 18 are further rewritten as follows:

$$Cin = \frac{T}{2W\dot{X}in}(W + 2L) + \frac{Ca}{2}\left(1 - \frac{\dot{X}out}{\dot{X}in}\right) \tag{19}$$

$$Cout = \frac{T}{2W\dot{X}out}(W - 2L) + \frac{Ca}{2}\left(1 - \frac{\dot{X}in}{\dot{X}out}\right) \tag{20}$$

Therefore, by controlling the damping coefficients of the inside and outside shock absorbers 116L and 116R as modified from the phantom damping coefficients Cg and Ca as expressed by equations 19 and 20 according to the change rates of Xin and Xout, the suspension system of FIG. 1 will operate as if it were the suspension system of FIG. 2, so that, when the vehicle body rolls due to a turn running of the vehicle, the vehicle body rolls around the pivot point P in the connection between the upper end of the phantom side shock absorber 122 and the phantom angular shock absorber 124, thereby more lowering the height of the mass center 118 according to a more rolling. Of course, the phantom damping coefficients Cg and Ca may be controlled in any appropriate manner according to any control concept separate from the inventive concept of the present invention.

The above-mentioned phantom damping system may be applied separately to a pair of front wheels and a pair of rear wheels as shown in FIGS. 3A and 3B. In such a case, by discriminating the parameters particular to the front and rear suspensions by suffixes "f" and "r", respectively, the following equations 24 and 25 are obtained, corresponding to equation 9:

$$\left(\frac{LCg}{W} + \frac{Cg}{2}\right)\dot{X}fin + \left(-\frac{LCg}{W} + \frac{Cg}{2}\right)\dot{X}fout = Tf \tag{21}$$

$$\left(\frac{LCg}{W} + \frac{Cg}{2}\right)\dot{X}rin + \left(-\frac{LCg}{W} + \frac{Cg}{2}\right)\dot{X}rout = Tr \tag{22}$$

Then, the damping coefficients for a set of front and rear and inside and outside of a turn during a rolling out are obtained as follows:

$$Cfin = \frac{Tf}{2Wf\dot{X}fin}(Wf + 2Lf) + \frac{Caf}{2}\left(1 - \frac{\dot{X}fout}{\dot{X}fin}\right) \tag{23}$$

$$Cfout = \frac{Tf}{2Wf\dot{X}fout}(Wf - 2Lf) + \frac{Caf}{2}\left(1 - \frac{\dot{X}fin}{\dot{X}fout}\right) \tag{24}$$

$$Crin = \frac{Tr}{2Wr\dot{X}rin}(Wr + 2Lr) + \frac{Car}{2}\left(1 - \frac{\dot{X}rout}{\dot{X}rin}\right) \tag{25}$$

$$Crout = \frac{Tr}{2Wr\dot{X}rout}(Wr - 2Lr) + \frac{Car}{2}\left(1 - \frac{\dot{X}rin}{\dot{X}rout}\right) \tag{26}$$

BRIEF DESCRIPTION OF THE DRAWINGS

In the accompanying drawings,

FIG. 26 is a flowchart for obtaining modification amounts ΔCgc2 and ΔCac2 for suppressing a consonant rolling of the vehicle body to a slalom driving based upon lateral acceleration of the vehicle body.

DESCRIPTION OF THE EMBODIMENTS

In the following, the present invention will be described in more detail in the form of some preferred embodiments with reference to the accompanying drawings.

Figure 4:
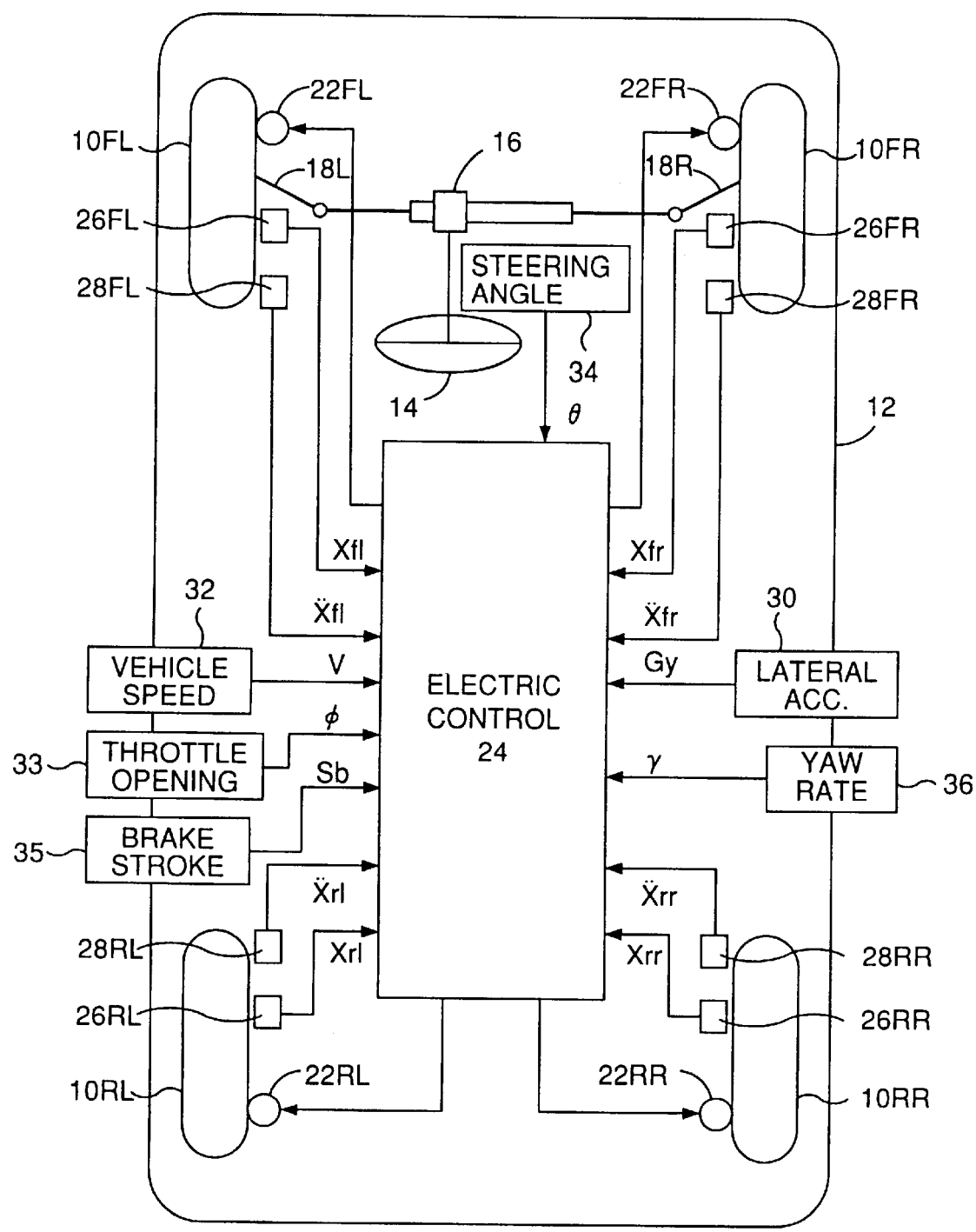
FIG. 4 is a diagrammatical view showing a four wheeled vehicle in which the damping coefficient control device according to the present invention is incorporated in the form of several embodiments.

Referring to FIG. 4, the vehicle herein shown has front left, front right, rear left and rear right wheels 10FL, 10FR, 10RL and 10RR suspended from a vehicle body 12. The front left and front right wheels 10FL and 10Fr are steered by a steering system including a steering wheel 14, a rack-and-pinion assembly 16, and left and right connecting rods 18L and 18R. The rear wheels 10RL and 10RR are driven by a drive system not shown in the figure, while the wheels 10FL, 10FR, 10RL and 10RR are separately braked by their wheel cylinders not shown in the figure being supplied with a hydraulic pressure from a hydraulic circuit according to a depression of a brake pedal by a driver, though not shown in FIG. 4, or under a control of electric control means 24. The vehicle body 12 is supported on the wheels 10FL, 10FR, 10RL and 10RR at portions thereof corresponding to these wheels via respective corresponding parallel combinations of suspension springs not shown in the figure and shock absorbers 22FL, 22FR, 22RL and 22RR, as diagrammatically shown in FIG. 1.

The electric control means 24 includes a microcomputer for conducting control calculations described in detail herein below based upon signals supplied thereto from wheel stroke sensors 26FL, 26FR, 26RL and 26RR indicating up and down strokes Xfl, Xfr, Xrl and Xrr of the front left, front right, rear left and rear right wheels, respectively, relative to the vehicle body, signals from vertical acceleration sensors 28FL, 28FR, 28RL and 28RR indicating vertical accelerations $\ddot{X}fl$, $\ddot{X}fr$, $\ddot{X}rl$ and $\ddot{X}rr$ of body portions vertically above the front left, front right, rear left and rear right wheels, respectively, a signal from a lateral acceleration sensor 30 indicating lateral acceleration Gy of the vehicle body, a signal from a vehicle speed sensor 32 indicating vehicle speed V, a signal from a throttle opening sensor 33 indicating opening φ of a throttle valve (not shown), a signal from a steering angle sensor 34 indicating steering angle θ, a signal from a brake stroke sensor 35 indicating brake stroke Sb of a brake pedal (not shown), a signal from a yaw rate sensor 36 indicating yaw rate γ of the vehicle, etc.

Figure 1:
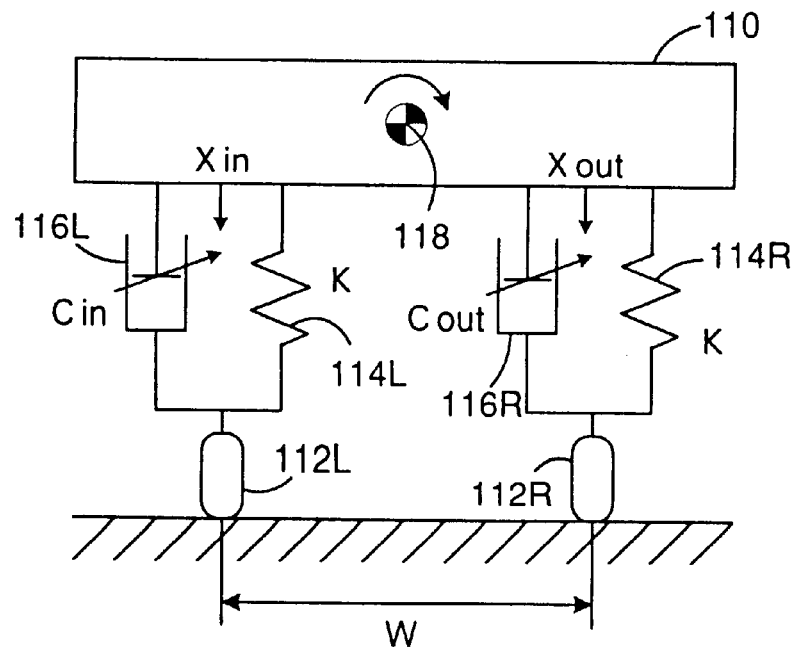
FIG. 1 is a standard skeleton model of the suspension system of a four wheeled vehicle viewed from a back thereof.
Figure 2:
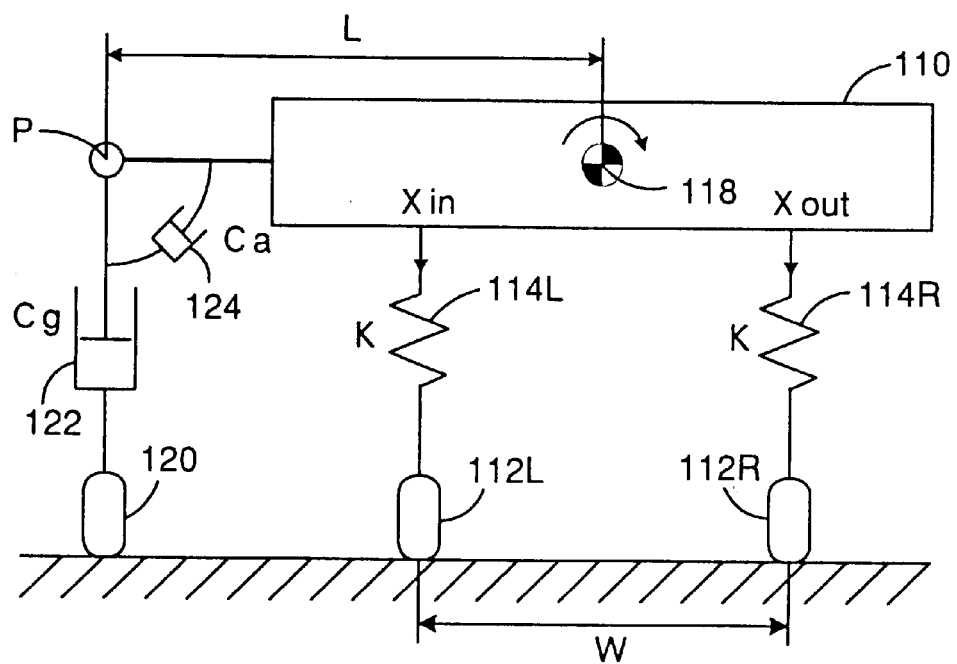
FIG. 2 is a skeleton model similar to FIG. 1, showing a vehicle suspension system incorporating a phantom side shock absorber and a phantom angular shock absorber instead of the left side and right side shock absorbers shown in FIG. 1.
Figure 3A:
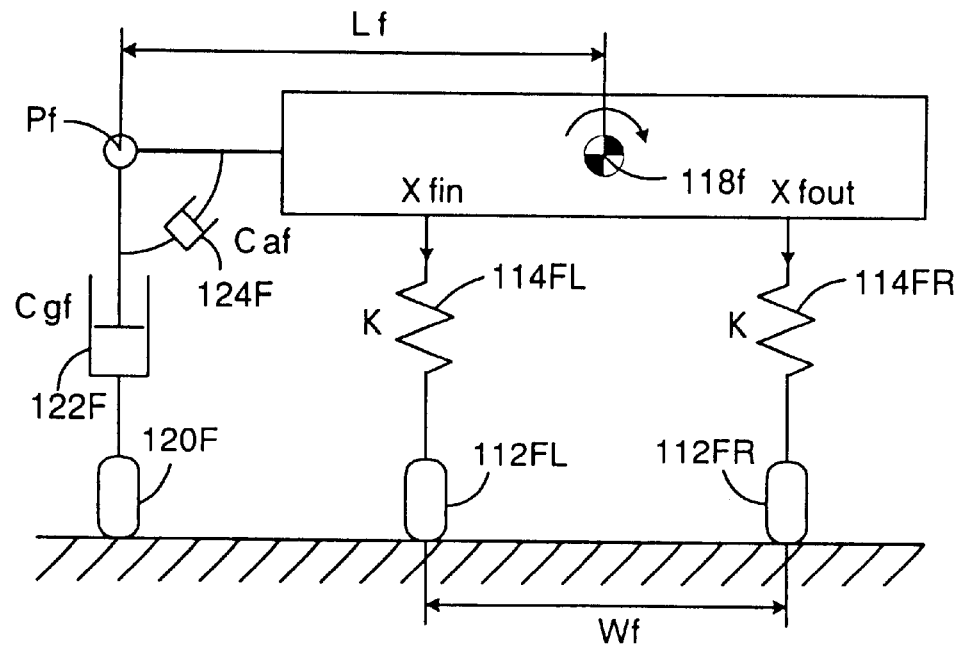
FIGS. 3A and 3B are skeleton models similar to that of FIG. 2, separately showing front and rear halves of the similar phantom damping system.
Figure 3B:
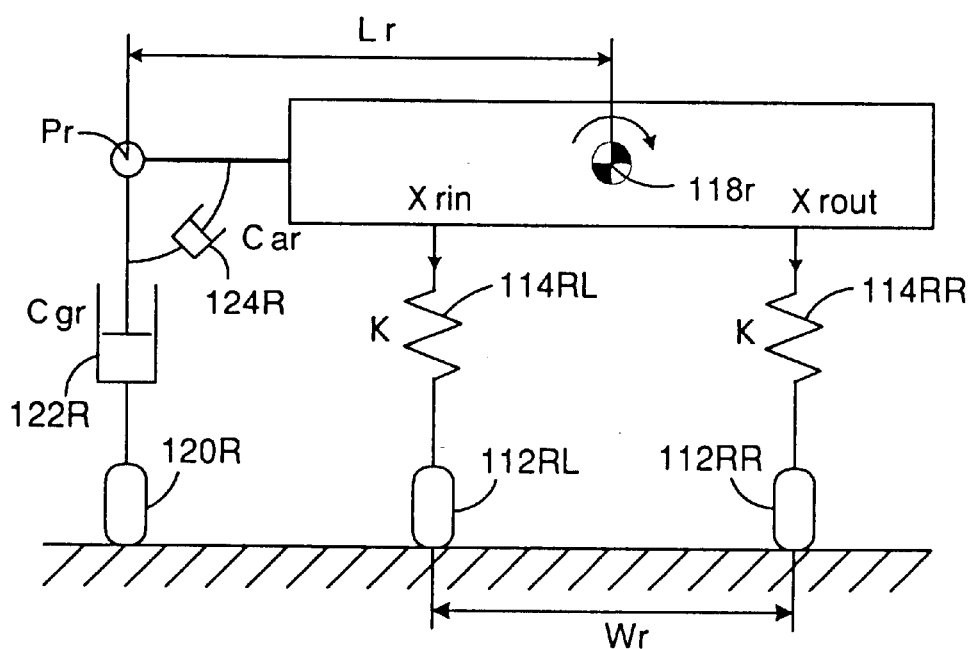

The damping control device according to the present invention is essentially incorporated in the electric control means 24, so as to receive such motion parameters of the vehicle as described above, to conduct certain control calculations as described hereinbelow, and to vary the damping coefficients of the shock absorbers 22FL-22RR so that the suspension system of the vehicle having a construction such as shown in FIG. 1 operates like a suspension system such as shown in FIGS. 3A and 3B.

In the following, the basic construction of the damping control device according to the present invention will be described in the form of its operation with reference to FIG. 5.

Figure 5:
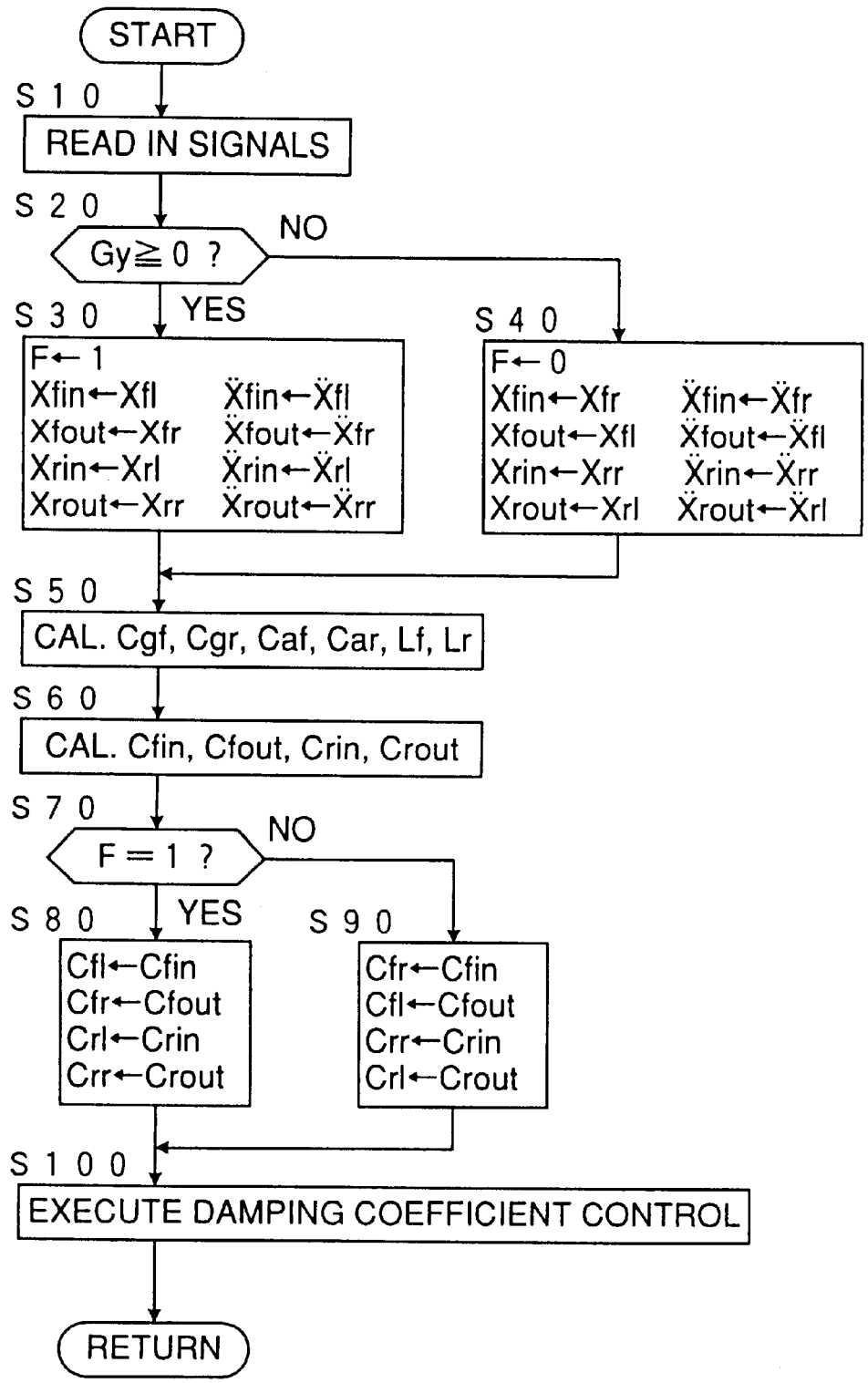
FIG. 5 is a flowchart showing the outline of the operation of the damping coefficient control device according to the present invention.

Referring to FIG. 5, when the damping control device according to the present invention is started for operation, in step 10, signals are read in from those sensors described above.

In step 20, it is judged if the lateral acceleration Gy is zero or positive, i.e. if the lateral acceleration is zero or acting leftward of the vehicle. When the answer is yes, the control proceeds to step 30, while when the answer is no, the control proceeds to step 40.

In step 30, by setting a flag F to 1, Xfl, Xfr, Xrl and Xrr detected by the wheel stroke sensors 26FL, 26FR, 26RL and 26RR are substituted for Xfin, Xfout, Xrin and Xrout, respectively, and $\ddot{X}fl$, $\ddot{X}fr$, $\ddot{X}rl$ and $\ddot{X}rr$ detected by the vertical acceleration sensors 28FL, 28FR, 28RL and 28RR are substituted for $\ddot{X}fin$, $\ddot{X}fout$, $\ddot{X}rin$ and $\ddot{X}rout$, respectively.

In step 40, by setting the flag F to 0, Xfr, Xfl, Xrr and Xrl are substituted for Xfin, Xfout, Xrin and Xrout, respectively, and $\ddot{X}fr$, $\ddot{X}fl$, $\ddot{X}rr$ and $\ddot{X}rl$ are substituted for $\ddot{X}fin$, $\ddot{X}fout$, $\ddot{X}rin$ and $\ddot{X}rout$, respectively.

Thus, the parameters Xfr, Xfl, Xrr and Xrl and $\ddot{X}fr$, $\ddot{X}fl$, $\ddot{X}rr$ and $\ddot{X}rl$ are alternatively set up for a left turn (with a straight running being included in this side only for convenience) and a right turn for the phantom shock absorber control.

In step 50, the damping coefficients Cgf and Cgr of the front the rear phantom side shock absorbers 122F and 122R, the damping coefficients Caf and Car of the front and rear phantom angular shock absorbers 124F and 124R, and the lateral distances Lf and Lr of the front and rear phantom side shock absorbers 122F and 122R are calculated as described in detail hereinbelow.

In step 60, the damping coefficients Cfin, Cfout, Crin and Crout for the shock absorbers of the front and rear wheels serving at the inside and outside of the turn, respectively, are calculated based upon the Cgf, Cgr, Caf, Car, Lf and Lr calculated in step 50.

In step 70, it is judged if the flag F is 1. When the answer is yes, the control proceeds to step 80, while when the answer is no, the control proceeds to step 90.

In step 80, Cfin, Cfout, Crin and Crout are put in for the damping coefficients Cfl, Cfr, Crl and Crr of the front left, front right, rear left and rear right shock absorbers 22FL, 22FR, 22RL and 22RR, while in step 90, Cfin, Cfout, Crin and Crout are put in for the damping coefficients Cfr, Cfl, Crr and Crl of the front right, front left, rear right and rear left shock absorbers 22FR, 22FL, 22RR and 22RL.

In step 100, the damping coefficients of the shock absorbers are controlled according to the values of the Cfl-Crr.

In the following, the calculations of Cgf, Cgr, Caf, Car, Lf and Lr conducted in step 50 will be described in more detail with respect to several embodiments.

Basically, the damping coefficients Cgf and Cgr of the phantom side shock absorbers 112F and 112R are substantially dependent upon the vertical stroking acceleration of the vehicle body relative to the ground surface, provided that the wheels are kept in contact with the ground surface. On the other hand, the damping coefficients Caf and Car of the phantom angular shock absorbers 124F and 124R are substantially dependent upon the rolling acceleration of the vehicle body around the front and rear mass centers 118F and 118R, respectively.

Therefore, vertical accelerations Ghf and Ghr of the front and rear mass centers 118F and 118R and rotational accelerations Grf and Grr of the vehicle body around the front and rear mass centers 118F and 118R are calculated as follows:

$$Ghf = (\ddot{X}fin + \ddot{X}fout)/2$$

$$Ghr = (\ddot{X}rin + \ddot{X}rout)/2$$

$$Grf = (\ddot{X}fin - \ddot{X}fout)/Wf$$

$$Grr = (\ddot{X}rin - \ddot{X}rout)/Wr$$

Figure 6A:
FIGS. 6A and 6B are maps for obtaining basic values of Cgf, Cgr and Caf, Car for Cgf, Cgr and Caf, Car and based upon the absolute values of vertical accelerations Ghf and Ghr of the front and rear mass centers.
Figure 6B:
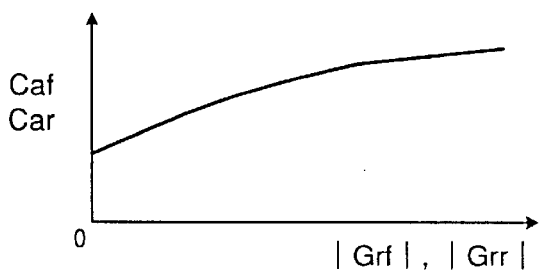

Then, looking at maps such as shown in FIGS. 6A and 6B based upon the absolute values of Ghf, Ghr, Grf and Grr, basic values of Cgf, Cgr, Caf and Car are obtained. Basic values of the lateral distances Lin and Lout of the front and rear phantom side shock absorbers 122F and 122R may be appropriately determined in comparison with the magnitudes of the wheel tread Wf and Wr, respectively.

Although in the maps of FIGS. 6A and 6B, the performances of Cgf and Cgr against the absolute values of Ghf and Ghr are respectively shown by a common curve, separate performance curves may be set up for Cgf and Cgr against the same absolute values of Ghf and Ghr, respectively. Similarly, although the performances of Caf and Car against the absolute values of Grf and Grr are shown by a common curve, the performances of Caf and Car may be separately set up against the same absolute values of Grf and Grr, respectively. The general performances of Cgf, Cgr, Caf and Car relative to Ghf and Ghr will be apparent from the maps. In any event, it will be appreciated that the maps of FIGS. 6A and 6B are designed as an embodiment of providing a phantom damping system such as shown in FIGS. 3A and 3B with a certain desirable operation performance. The present invention is not limited to such a particular performance.

Figure 7A:
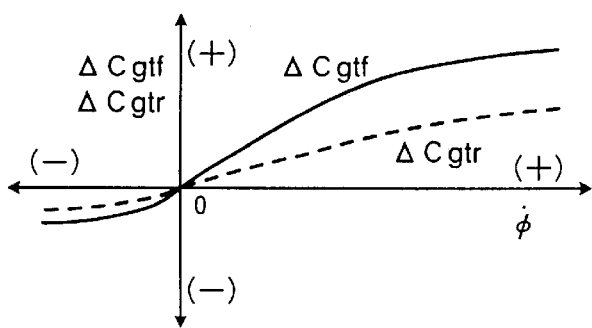
FIGS. 7A and 7B are maps for obtaining modification amounts $\Delta$Cgtf, $\Delta$Cgtr and $\Delta$Catf, $\Delta$Catr for Cgf, Cgr and Caf, Car based upon throttle opening rate $\dot{\phi}$.
Figure 7B:
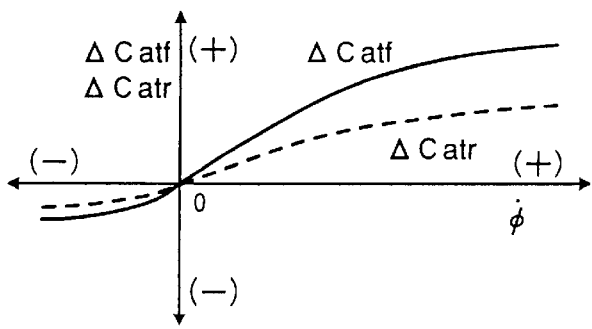

The damping coefficients Cgf and Cgr of the front and rear phantom side shock absorbers 122F and 122R and the damping coefficients Caf and Car of the front and rear phantom angular shock absorbers 124F and 124R may be modified according to a rate (i.e. speed) of opening or closing of the throttle valve (not shown) of the vehicle according to such performances as shown in FIGS. 7A and 7B, respectively. The rate of opening or closing of the throttle valve will be available by differentiating the throttle opening $\dot\phi$ detected by the throttle opening sensor 33.

As an embodiment, modification amounts $\Delta$Cgtf and $\Delta$Cgtr for additively modifying Cgf and Cgr according to the throttle opening change rate $\dot\phi$ are so determined as to respectively follow such performances as shown by the maps of FIG. 7A, wherein $\Delta$Cgtf for the front phantom side shock absorber 116L is made larger than $\Delta$Cgtr for the rear phantom side shock absorber 122R, so as thereby to suppress a nose diving of the vehicle body by an abrupt acceleration of a rear drive vehicle.

Similarly, in the maps of FIG. 7B showing modification amounts $\Delta$Catf and $\Delta$Catr for additively modifying Caf and Car according to the throttle opening change rate $\dot\phi$, $\Delta$Catf for the front phantom angular shock absorber 124F is made larger than $\Delta$Catr for the rear phantom angular shock absorber 124R, for the same reason as described above with respect to $\Delta$Cgtf and $\Delta$Cgtr. The general performances of $\Delta$Cgtf, $\Delta$Cgtr, $\Delta$Catf and $\Delta$Catr relative to $\dot\phi$ will be apparent from the maps.

The modifications by $\Delta$Cgtf, $\Delta$Cgtr, $\Delta$Catf and $\Delta$Catr are such that Cgf, Cgr, Caf and Car basically obtained from the maps of FIGS. 6A and 6B are respectively increased by $\Delta$Cgtf, $\Delta$Cgtr, $\Delta$Catf and $\Delta$Catr.

Figure 8A:
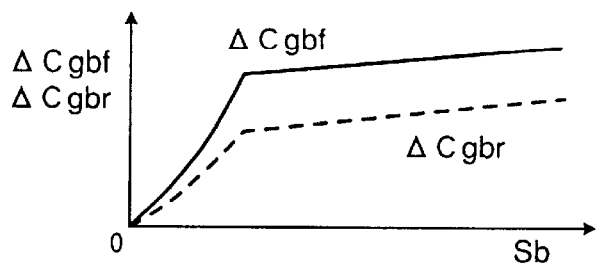
FIGS. 8A and 8B are maps for obtaining modification amounts $\Delta$Cgbf, $\Delta$Cgbr and $\Delta$Cabf, $\Delta$Cabr for Cgf, Cgr and Caf, Car based upon brake stroke Sb.
Figure 8B:
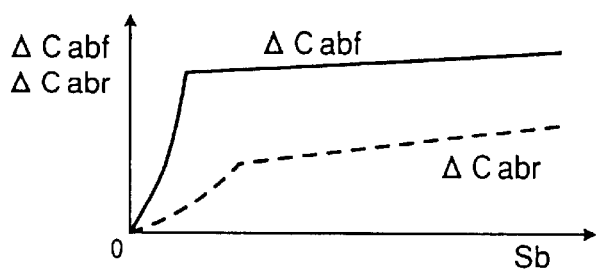

The damping coefficients Cgf, Cgr, Caf and Car may further be modified according to a braking in a manner such as shown by maps of FIGS. 8A and 8B, respectively.

As an embodiment, modification amounts $\Delta$Cgbf and $\Delta$Cgbr for additively modifying Cgf and Cgr are changed against a brake stroke Sb detected by the brake stroke sensor 35 as shown by the curves of FIG. 8A. Similarly, as an embodiment, modification amounts $\Delta$Cabf and $\Delta$Cabr for additively modifying Caf and Car are changed against the braking Sb as shown by the curves of FIG. 8B.

As will be noted in FIGS. 8A and 8B, the modification amounts $\Delta$Cgbf and $\Delta$Cabf for the front phantom side and angular shock absorbers are made appropriately larger than the modification amounts $\Delta$Cgbr and $\Delta$cabr for the rear phantom side and angular shock absorbers, respectively, so that thereby a nose diving of the vehicle body by an abrupt braking is suppressed. The general performances of $\Delta$Cgbf, $\Delta$Cgbr, $\Delta$Cabf and $\Delta$Cabr relative to Sb will be apparent from the maps.

The modifications by $\Delta$Cgbf, $\Delta$Cgbr, $\Delta$Cabf and $\Delta$Cabr may also be made such that these modification amounts are added to the corresponding Cgf, Cgr, Caf and Car basically obtained from the maps of FIGS. 6A and 6B.

Figure 9A:
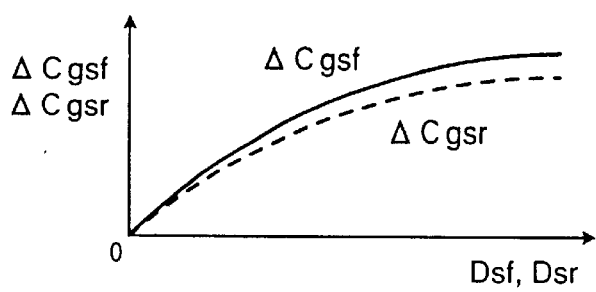
FIGS. 9A and 9B are maps for obtaining modification amounts $\Delta$Cgsf, $\Delta$Cgsr and $\Delta$Casf, $\Delta$Casr for Cgf, Cgr and Caf, Car based upon swaying indexes Dsf and Dsr.
Figure 9B:
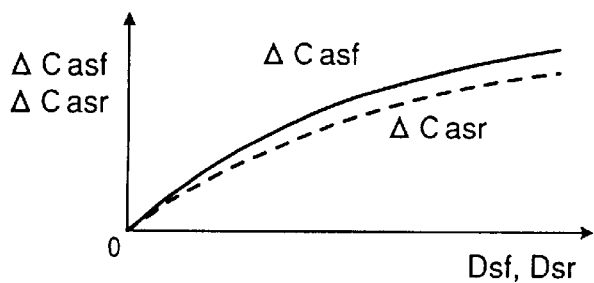

The damping coefficients Cgf, Cgr, Caf and Car may further be modified against a swaying of the vehicle body. For such a modification, first the vertical accelerations $\ddot{X}j$ (j=fin, fout, rin and rout) detected by the vertical acceleration sensors 28FL-28RR are each processed by a band pass filter for passing those of consonant frequencies of the vertical stroking vibrations of front and rear portions of the vehicle body above the front and rear suspension springs, so as to obtain swaying indexes Dsf and Dsr for the front and rear portions of the vehicle. Then, modification amounts $\Delta$Cgsf and $\Delta$Cgsr for additively modifying Cgf and Cgr are obtained against the magnitudes of Dsf and Dsr, respectively, according to such maps as shown in FIG. 9A. Similarly, modification amounts $\Delta$Casf and $\Delta$Casr for additively modifying Caf and Car are obtained against Dsf and Dsr, respectively, according to such maps as shown in FIG. 9B. By the damping coefficients Cgf, Cgr, Caf and Car being increased by the modification amounts ΔCgsf, ΔCgsr, ΔCasf and ΔCasr, respectively, according to the magnitudes of Dsf and Dsr, a consonant swaying of the vehicle body is effectively suppressed.

The general performances of ΔCgsf, ΔCgsr, ΔCasf and ΔCasr relative to Dsf or Dsr will be apparent from the maps. However, it will be desirable that the modifications by ΔCgsf, ΔCgsr, ΔCasf and ΔCasr are not directly made but are made in a harmony with a rattling of the vehicle body and a flapping of the wheels described hereinbelow.

Figure 10A:
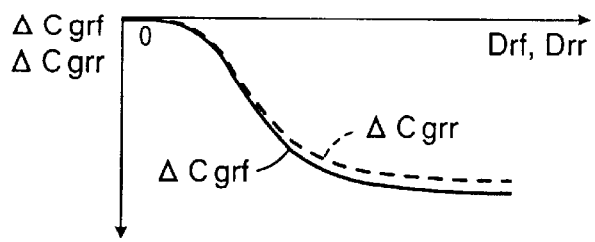
FIGS. 10A and 10B are maps for obtaining modification amounts $\Delta$Cgrf, $\Delta$Cgrr and $\Delta$Carf, $\Delta$Carr for Cgf, Cgr and Caf, Car based upon rattling indexes Drf and Drr.
Figure 10B:
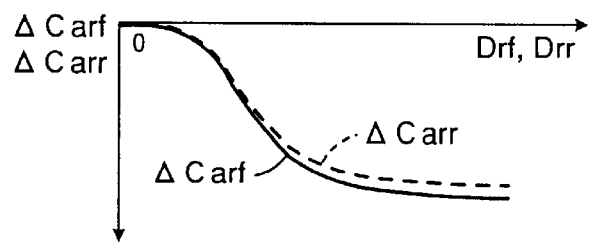

The damping coefficients Cgf, Cgr, Caf and Car may further be modified against a rattling of the vehicle body. For such a modification, the vertical accelerations $\ddot{X}j$ (j=fin, fout, rin and rout) detected by the vertical acceleration sensors 28FL-28RR are processed by a band pass filter for passing those of rattling frequencies of front and rear portions of the vehicle body to obtain rattling indexes Drf and Drr for the front and rear portions of the vehicle. Then, negative modification amounts ΔCgrf and ΔCgrr for Cgf and Cgr are obtained against the magnitudes of Drf and Drr according to maps such as shown in FIG. 10A, so that the front and rear phantom side shock absorbers 122F and 122R are softened according to an increase of the rattling indexes Drf and Drr. Similarly, negative modification amounts ΔCarf and ΔCarr for Caf and Car are obtained against the magnitudes of Drf and Drr according to maps such as shown in FIG. 10B, so that the front and rear phantom angular shock absorbers 124F and 124R are also softened according to an increase of the rattling indexes Drs and Drr. The general performances of ΔCgrf, ΔCgrr, ΔCarf and ΔCarr relative to Drf or Drr will be apparent from the maps.

Figure 11A:
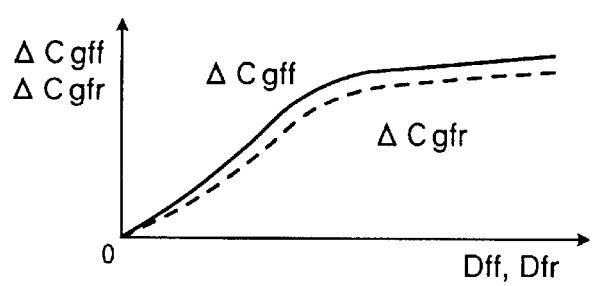
FIGS. 11A and 11B are maps for obtaining modification amounts $\Delta$Cgff, $\Delta$Cgfr and $\Delta$Caff, $\Delta$Cafr for Cgf, Cgr and Caf, Car based upon flapping indexes Dff and Dfr.
Figure 11B:
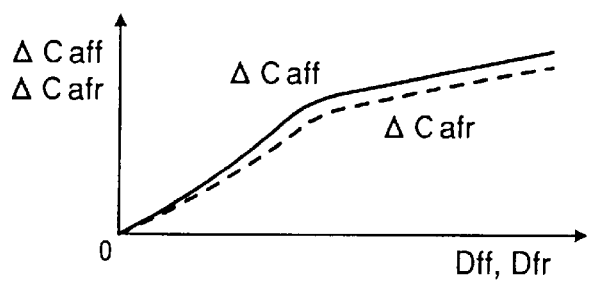

The damping coefficients Cgf, Cgr, Caf and Car may further be modified against a flapping of the wheels. For this purpose, vertical velocities $\dot{X}j$ (j=fin, fout, rin and rout) of the wheels are obtained by differentiating the vertical strokes Xj (j=fin, fout, rin and rout) detected by the vertical stroke sensors 26FL-26RR or integrating the vertical accelerations $\ddot{X}j$ (j=fin, fout, rin and rout) detected by the vertical acceleration sensors 28FL-28RR on a time basis, and then by processing the vertical stroking velocities $\dot{X}j$ by a band pass filter for passing those of the flapping frequencies of the wheels to obtain flapping indexes Dff and Dfr. Then, modification amounts ΔCgff and ΔCgfr for additively modifying Cgf and Cgr are obtained against the magnitudes of Dff and Dfr according to maps such as shown in FIG. 11A, so that the front and rear phantom side shock absorbers 122F and 122R are hardened according to an increase of the flapping indexes Dff and Dfr. Similarly, modification amount ΔCaff and ΔCafr for additively modifying Caf and Car are obtained against Dff and Dfr according to maps such as shown in FIG. 11B, so that the front and rear phantom angular shock absorbers 124F and 124R are also hardened according to an increase of the flapping indexes Dff and Dfr. The general performances of ΔCgff, ΔCgfr, ΔCaff and ΔCafr relative to Dff or Dfr will be apparent from the maps.

The modifications by ΔCgsf, ΔCgsr, ΔCasf and ΔCasr against the swaying of the vehicle body, ΔCgrf, ΔCgrr, ΔCarf and ΔCarr against the rattling of the vehicle body, and ΔCgff, ΔCgfr, ΔCaff and ΔCafr against the flapping of the wheels may be made, as a matter of individual principle, such that each of these modification amounts is added to each corresponding one of Cgf, Cgr, Caf and Car basically obtained from the maps of FIGS. 6A and 6B. However, when the modification amounts against the swaying of the vehicle body, the rattling of the vehicle body, and the flapping of the wheels are applied at the same time, there might occur an interference there among, canceling the effects of the respective modification amounts. Therefore, it might be better that these modification amounts are processed in relation to one another before being respectively added to Cgf, Cgr, Caf and Car, such that the larger as a whole of a set of ΔCgsf, ΔCgsr, ΔCasf and ΔCasr and a set of ΔCgff, ΔCgfr, ΔCaff and ΔCafr are selected, while the larger as a whole of thus selected set and a set of ΔCgrf, ΔCgrr, ΔCarf and ΔCarr in the absolute values thereof are selected for an execution of the modification. The comparison of such two sets of modification amounts as a whole may be made, for example, by comparing the absolute value of the largest one of each set so that the set including the winner is selected. The first selection is to put a priority on either the modification against the swaying of the vehicle body or the flapping of the wheels, without sacrificing much of the other, because the performances of the two modification amounts are rather similar. On the other hands, the second selection is to put a priority on one of the modification against either the swaying of the vehicle body or the flapping of the wheels and the modification against the rattling of the vehicle body, substantially sacrificing the other, because the performances of the two modification amounts are rather opposite.

Figure 12A:
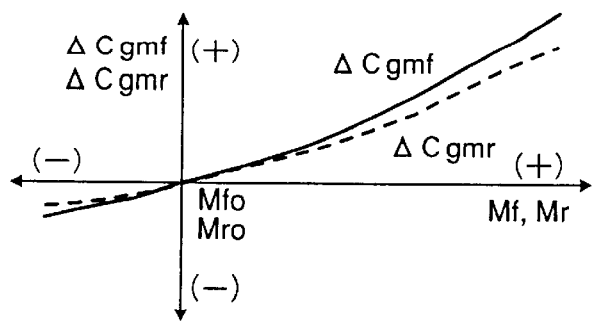
FIGS. 12A and 12B are maps for obtaining modification amounts $\Delta$Cgmf, $\Delta$Cgmr and $\Delta$Camf, $\Delta$Camr for Cgf, Cgr and Caf, Car based upon masses Mf and Mr.
Figure 12B:
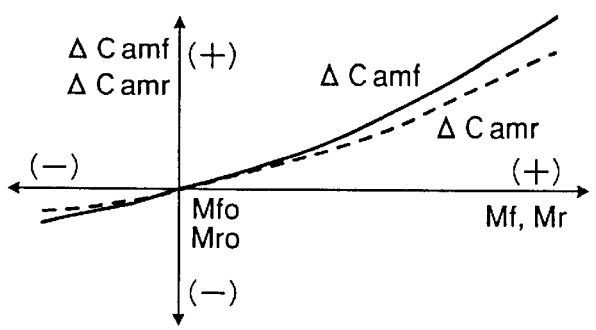

The damping coefficients Cgf, Cgr, Caf and Car may further be modified according to a change of the load on the vehicle. For such a purpose, maps such as shown in FIGS. 12A and 12B may be prepared. According to the map of FIG. 12A, modification amounts ΔCgmf and ΔCgmr for additively modifying Cgf and Cgr are varied against a front part Mf and a rear part Mr of the total mass including the vehicle body and the load on the vehicle, so as to be substantially proportionally increased relative to increases of front and rear masses Mf and Mr from standard front and rear masses Mof and Mor determined for a standard load. The magnitudes of Mf and Mr will be available from Xj (j=fin, fout, rin and rout) output by the wheel stroke sensors 26FL, 26FR, 26RL and 26RR. Similarly, modification amounts ΔCamf and ΔCamr for additively modifying Caf and Car are varied against increases of Mf and Mr relative to Mof and Mor as shown in the map of FIG. 12B. The general performances of ΔCgmf, ΔCgmr, ΔCamf and ΔCamr relative to Mf or Mr will be apparent from the maps.

The modifications by ΔCgmf, ΔCgmr, ΔCamf and ΔCamr may also be made such that these modification amounts are added to the corresponding Cgf, Cgr, Caf and Car basically obtained from the maps of FIGS. 6A and 6B.

Figure 13A:
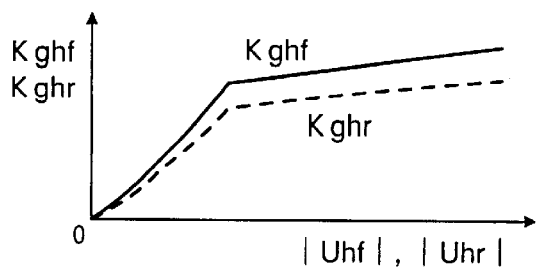
FIGS. 13A and 13B are maps for obtaining modification factors $\Delta$Kghf, $\Delta$Kghr and $\Delta$Kahf, $\Delta$Kahr for Cgf, Cgr and Caf, Car based upon vertical stroking velocities Uhf and Uhrm.
Figure 13B:
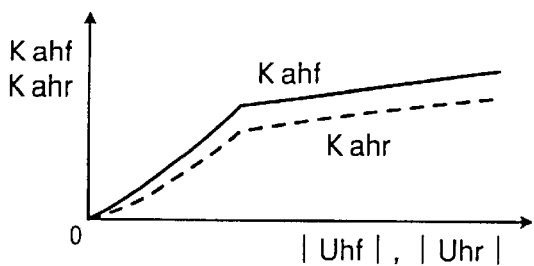

The damping coefficients Cgf, Cgr, Caf and Car may further be modified according to a change of vertical stroking velocity of the vehicle body. For this purpose, vertically stroking velocities $\dot{X}j$ (j=fin, fout, rin and rout) of the wheels are obtained by differentiating the vertical strokes Xj (j=fin, fout, rin and rout) or integrating the vertical accelerations $\ddot{X}j$ (=fin, fout, rin and rout) on a time basis, such that vertical stroking velocities Uhf and Uhr of front and rear portions of the vehicle body are obtained as a mean value of $\dot{X}$fin and $\dot{X}$fout and a mean value of $\dot{X}$rin and $\dot{X}$rout, respectively. Then, by referring to maps such as shown in FIGS. 13A and 13B, modification factors Kghf, Kghr, Kahf and Kahr are obtained as factors to be multiplied to Cgf, Cgr, Caf and Car, respectively, for reflecting a variation of the damping performances of the front and rear phantom side and angular shock absorbers 122F, 122R, 124F and 124R according to the velocity of damping movement, as shown by the curves of FIGS. 13A and 13B. The general performances of Kghf, Kghr, Kahf and Kahr relative to Uhf or Uhr will be apparent from the maps.

In each of the above-mentioned maps of FIGS. 9A, 9B to 13A, 13B, the relative difference between the modification amounts for the front and rear phantom side or angular shock absorbers is only an example. The relative magnitudes of the modification amounts for the front and the rear may be the same as one another or may be reversed against one another according to the designs of vehicles.

The damping coefficients Cgf, Cgr, Caf and Car and the lateral distances Lf and Lr may further be modified against a side slipping condition of the vehicle reflecting thereon a tendency for oversteering or understeering. For this purpose, a standard (or theoretical) yaw rate $\gamma t$ is calculated based upon the steering angle $\theta$ detected by the steering angle sensor 34 and vehicle speed V detected by the vehicle speed sensor 32 as follows:

$$\gamma t = V\theta/(1+\alpha V^2)H$$

$$\gamma t \leftarrow \gamma/(1+Ts)$$

wherein, H is a wheel base of the vehicle, $\alpha$ is an appropriate stability factor, and T and s are a time constant and the composite variable in the Laplace transformation, respectively. The steering angle $\theta$ and the yaw rate $\gamma t$ or $\gamma$ are made positive when the vehicle is making a left turn, while they are made negative when the vehicle is making a right turn.

Figure 14:
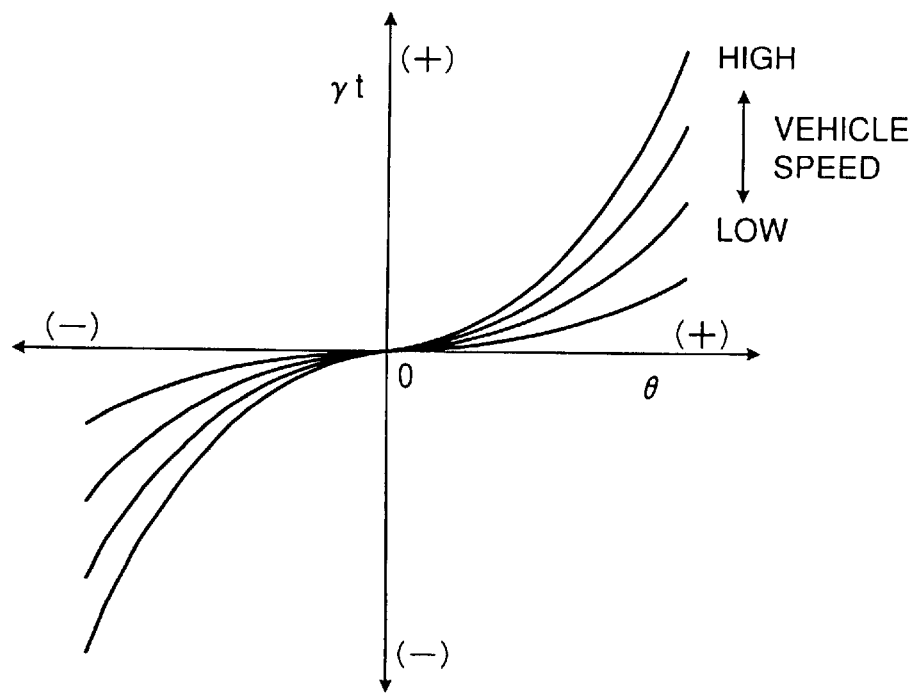
FIG. 14 is a map for obtaining standard yaw rate $\gamma$t based upon steering angle $\theta$ and vehicle speed V.

Then, a deviation $\Delta\gamma$ of an actual yaw rate $\gamma$ detected by the yaw rate sensor 36 against the standard yaw rate $\gamma t$ is calculated as $\Delta\gamma = \gamma - \gamma t$. Or alternatively, the standard yaw rate $\gamma t$ may be obtained from a map such as shown in FIG. 14 according to the values of steering angle $\theta$ and vehicle speed V.

Figure 15:
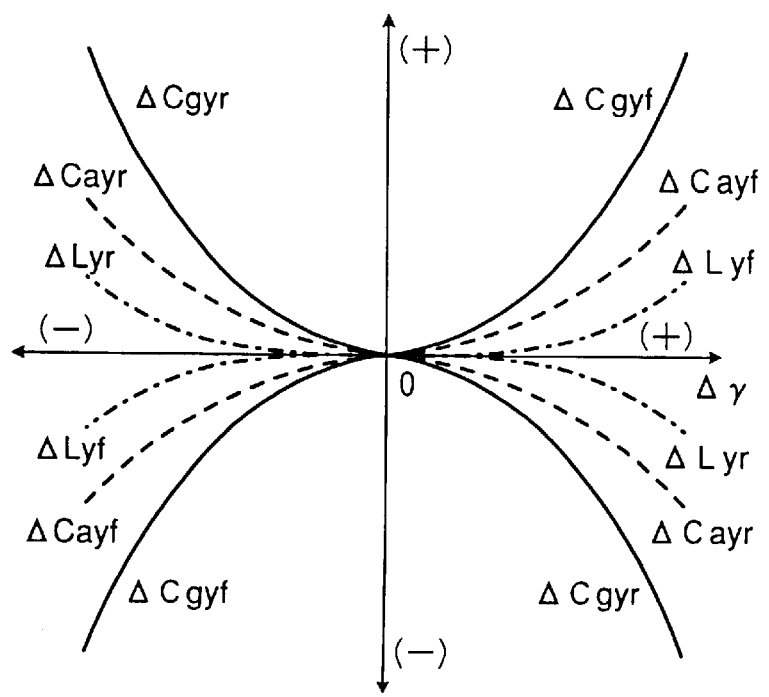
FIG. 15 is a map for obtaining modification amounts ΔCgyf, ΔCgyr, ΔCayf, ΔCayr, ΔLyf and ΔLyr based upon yaw rate deviation Δγ with a discrimination of the sign of γ.

Then, by looking at a map such as shown in FIG. 15 according to the magnitude and the sign of $\Delta\gamma$, modification amounts $\Delta$Cgyf, $\Delta$Cgyr, $\Delta$Cayf, $\Delta$Cayr, $\Delta$Lyf and $\Delta$Lyr for additively modifying Cgf, Cgr, Caf, Car, Lf and Lr are obtained, such that when $\Delta\gamma$ is positive, $\Delta$Cgyf, etc. are read out in the first and fourth quadrants, while when $\Delta\gamma$ is negative, $\Delta$Cgyf, etc. are read out in the second and third quadrants.

The general performances of $\Delta$Cgyf, $\Delta$Cgyr, $\Delta$Cayf, $\Delta$Cayr, $\Delta$Lyf and $\Delta$Lyr relative to $\Delta\gamma$ will be apparent from the map. The modification amounts $\Delta$Cgyf, etc. thus read out may further be processed so as not to exceed limit values in the absolute values thereof respectively imposed thereon.

Figure 16A:
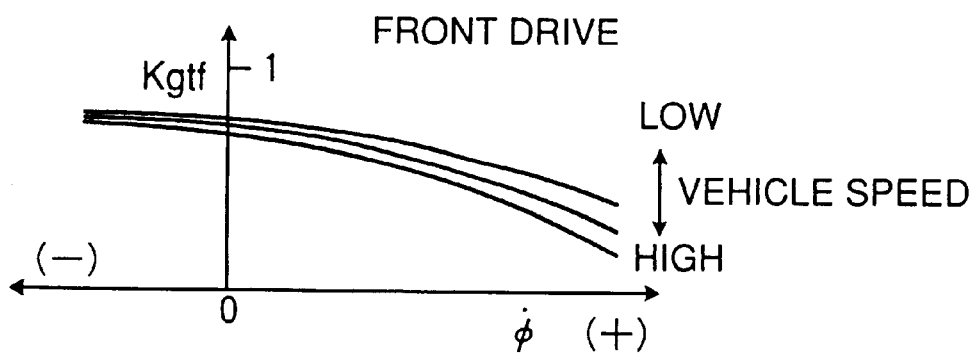
FIGS. 16A, 16B and 16C are maps for obtaining sharing ratios Kgtf, Katf and Kltf based upon throttle opening rate $\dot{\phi}$ for front drive vehicles.

The damping coefficients Cgf and Cgr designed have the same performance relative to |Ghf| and |Ghr| in FIG. 6A may be modified to be shared by such a proportioning factor Kgtf as shown in FIG. 16A according to the throttle opening rate $\phi$ and the vehicle speed. According to the proportioning factor Kgtf, the damping coefficients for the front and rear phantom side shock absorbers 122F and 122R may be modified such as Cgf $\leftarrow$(Cgf+Cgr)·Kgtf and Cgr$\leftarrow$(Cgf+Cgr)·(1–Kgtf), respectively, provided that Cgf and Cgr are first read out from a map such as shown in FIG. 6A.

Figure 16B:
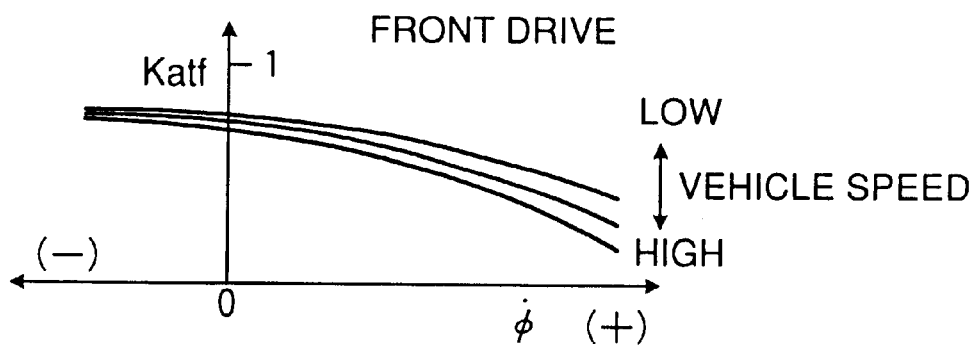

Similarly, Caf and Car may also be modified from the values read out from a map such as shown in FIG. 6B by a proportioning factor Katf such as shown in FIG. 16B according to the throttle opening rate $\phi$ and the vehicle speed. In this case, the damping coefficients for the front and rear phantom angular shock absorbers 124F and 124R may be modified such as Caf$\leftarrow$(Caf+Car)·Katf and Car$\leftarrow$(Caf+Car)·(1–Katf) based upon Caf and Car first read out from a map such as shown in FIG. 6B.

Figure 16C:
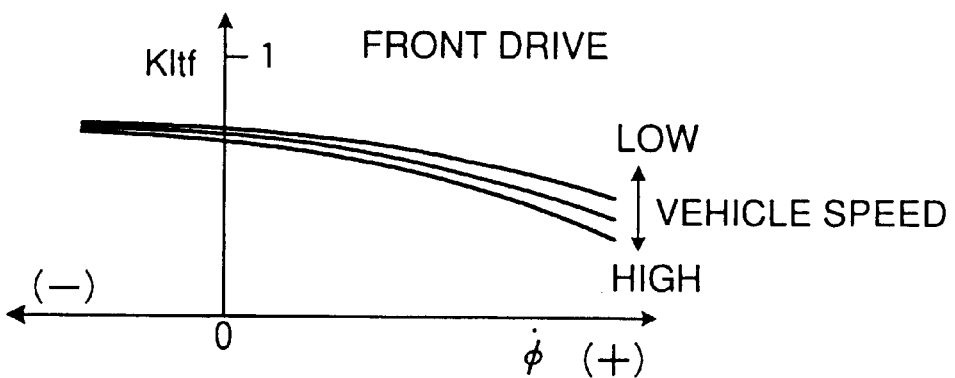

Similarly, the lateral distances Lf and Lr may also be modified from the values initially determined to start from certain predetermined values or read out from those maps therefor described hereinbelow by a proportioning factor Katf such as shown in FIG. 16C according to the throttle opening rate $\phi$ and the vehicle speed. In this case, the distances for the front and rear phantom side shock absorbers 122F and 122R may be modified such as Lf$\leftarrow$(Lf+Lr)·Kltf and Lr$\leftarrow$(Lf+Lr)·(1–Kltf) based upon Lf and Lr initially set up or first read out from a map described hereinbelow.

Figure 17A:
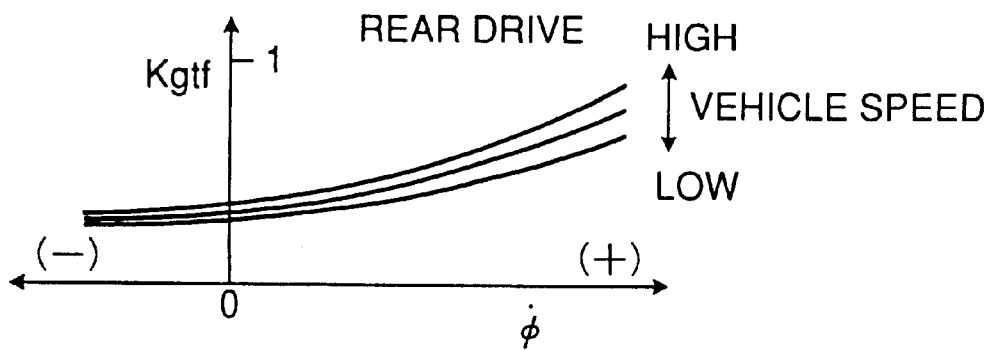
FIGS. 17A, 17B and 17C are maps for obtaining sharing ratios Kgtf, Katf and Kltf based upon throttle opening rate $\dot{\phi}$ for rear drive vehicles.
Figure 17B:
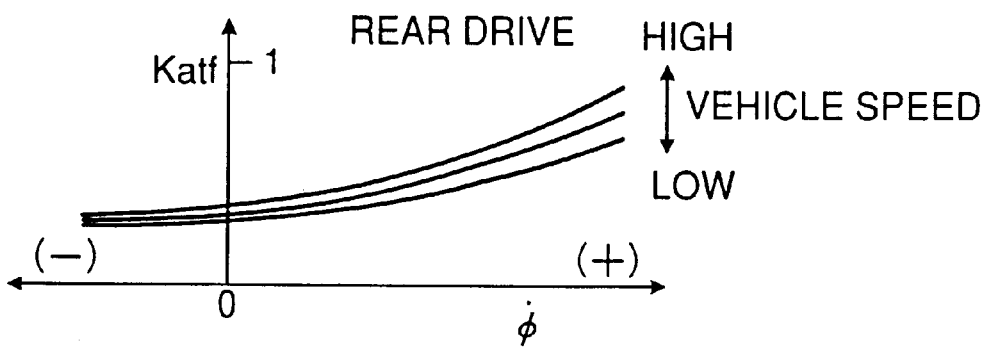
Figure 17C:
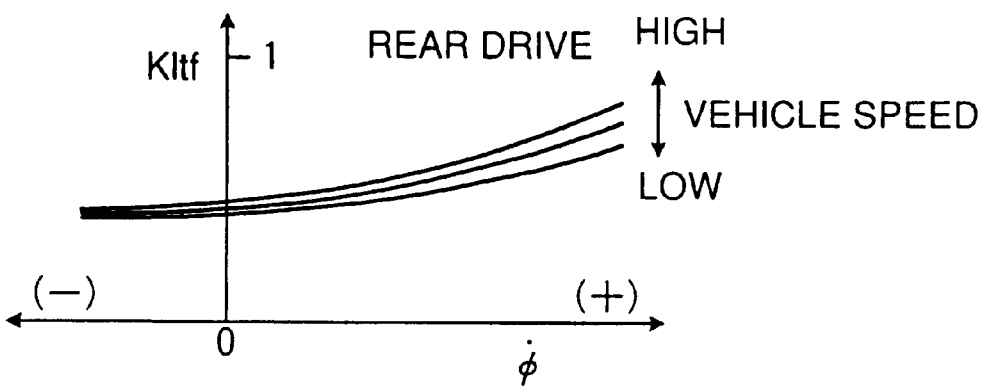

Cgf, Cgr, Caf, Car, Lf and Lr of a rear drive vehicle may be modified in the same manner as above by Kgtf, Katf and Kltf read out respectively from maps such as shown in FIGS. 17A, 17B and 17C. The general performances of Kgtf, Katf and Kltf relative to Rt and the vehicle speed will be apparent from the maps. They are generally opposite to those of the front drive vehicle.

A similar modification of sharing of the damping actions by the front and rear phantom side or angular shock absorbers 122F and 122R or 124F and 124R between the front and the rear may be made against a brake stroke denoted as Sb with reference to FIGS. 8A and 8B. For this purpose, maps such as shown in FIGS. 18A, 18B and 18C are prepared for an ordinary type four wheeled vehicle, while maps such as shown in FIGS. 19A, 19B and 19C are prepared for a sports type four wheeled vehicle in which it is desirable that the cornering power of the rear wheels saturates earlier than in the ordinary type vehicle for an easier cornering.

Figure 18A:
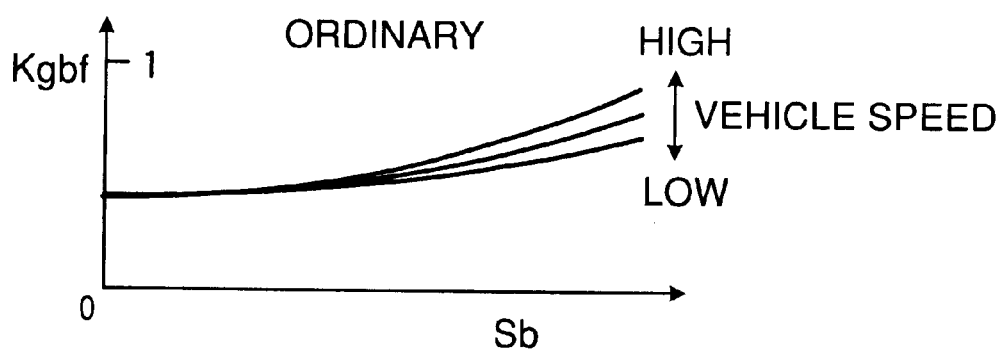
FIGS. 18A, 18B and 18C are maps for obtaining sharing ratios Kgbf, Kabf and Klbf based upon brake stroke Sb for ordinary type vehicles.
Figure 18B:
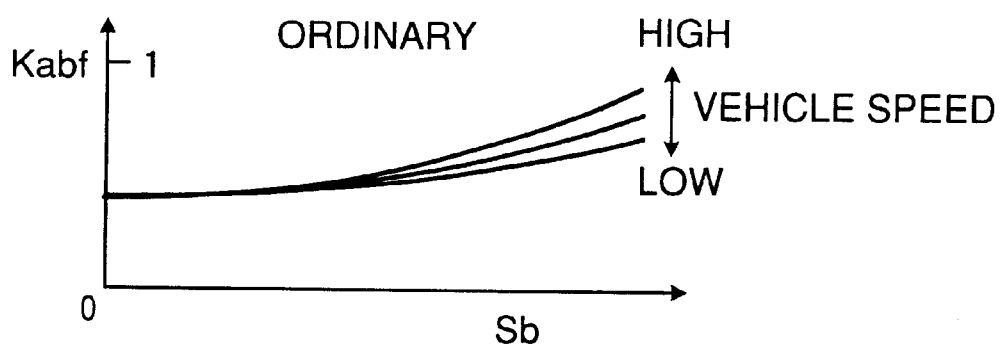
Figure 18C:
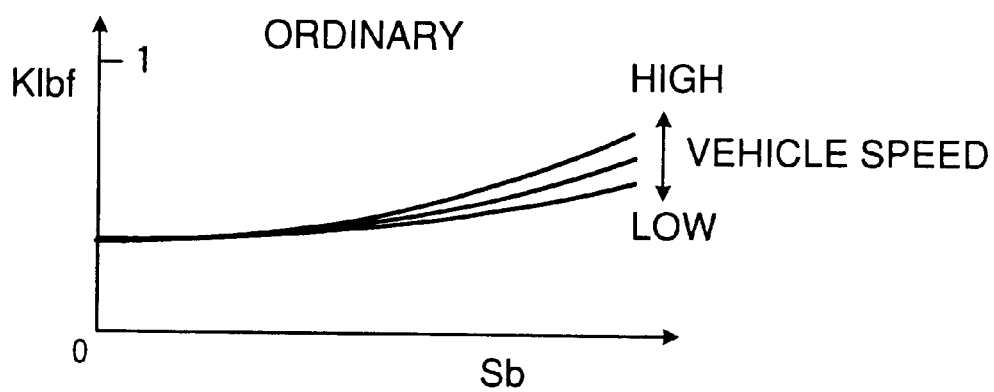

In FIGS. 18A, 18B and 18C, Kgbf, Kabf and Klbf are sharing ratios of the damping actions by the front and rear phantom side and angular shock absorbers 122F, 122R and 124F, 124R between the front and rear shock absorbers against the brake stroke Sb according to various vehicle speeds in an ordinary type four wheeled vehicle, and are applied to Cgf, Cgr, Caf, Car, Lf and Lr in a similar manner as above such that these are modified as Cgf$\leftarrow$(Cgf+Cgr) ·Kgbf, Cgr$\leftarrow$(Cgf+Cgr)·(1–Kgbf), Caf$\leftarrow$(Caf+Car)·Kabf, Car$\leftarrow$(Caf+Car)·(1–Kabf), Lf$\leftarrow$(Lf+Lr)·Klbf and Lr$\leftarrow$(Lf+Lr)·(1–Klbf), respectively. The general performances of Kgbf, Kabf and Klbf relative to Sb will be apparent from the maps.

Figure 19A:
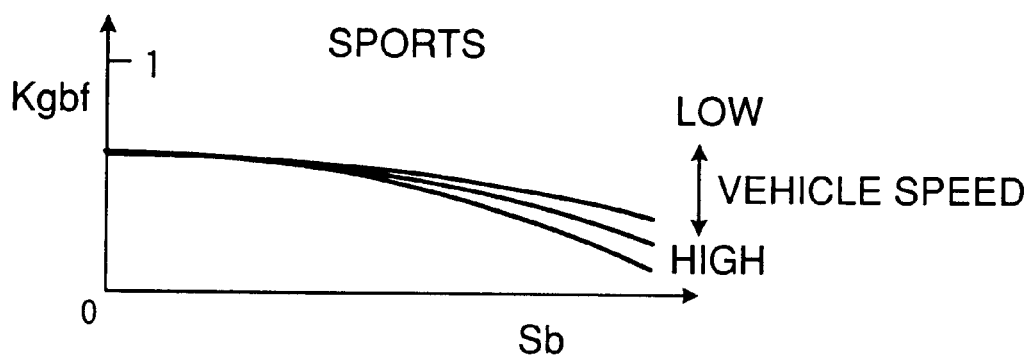
FIGS. 19A, 19B and 19C are maps for obtaining sharing ratios Kgbf, Kabf and Klbf based upon brake stroke Sb for sports type vehicles.
Figure 19B:
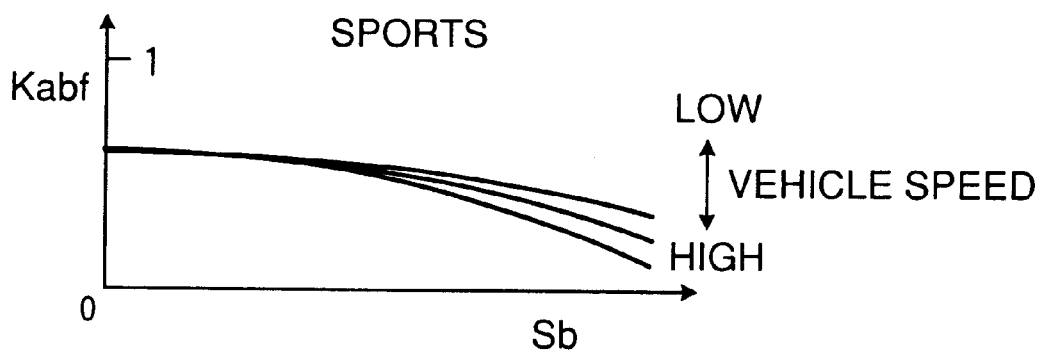
Figure 19C:
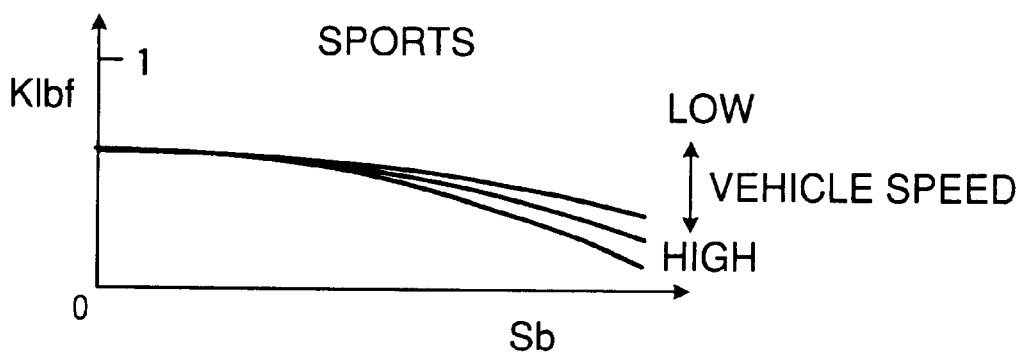

Similarly, Kgbf, Kabf and Klbf in FIGS. 19A, 19B and 19C are sharing ratios of the damping actions by the front and rear phantom side and angular shock absorbers 122F, 122R and 124F, 124R between the front and the rear shock absorbers against the brake stroke Sb according to various vehicle speeds in a sports type four wheeled vehicle, and are applied to Cgf, Cgr, Caf, Car, Lf and Lr in a similar manner as above such that these are modified as Cgf$\leftarrow$(Cgf+Cgr) ·Kgbf, Cgr$\leftarrow$(Cgf+Cgr)·(1–Kgbf), Caf$\leftarrow$(Caf+Car)·Kabf, Car$\leftarrow$(Caf+Car)·(1–Kabf), Lf$\leftarrow$(Lf+Lr)·Klbf and Lr$\leftarrow$(Lf+Lr)·(1–Klbf), respectively. The general performances of Kgbf, Kabf and Klbf relative to Sb will be apparent from the maps. They are generally opposite to those of the ordinary type vehicle. In the sports type vehicles, it is desirable that the cornering power of the rear wheels saturates earlier than in the ordinary type vehicle for an easier turn.

Figure 20:
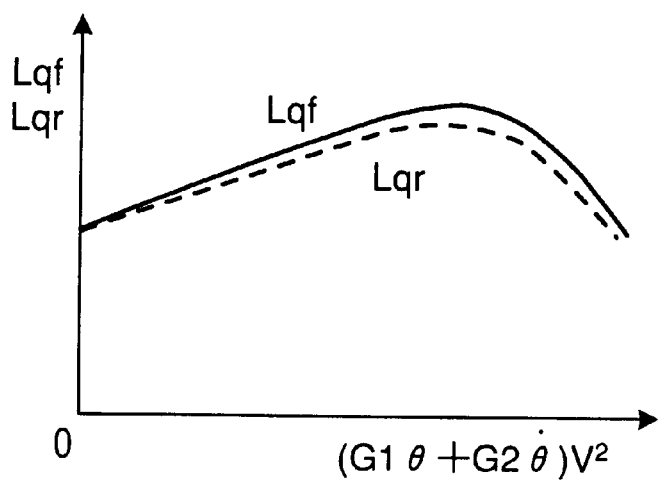
FIG. 20 is a map for obtaining lateral distances Lf and Lr based upon $G1 \cdot \theta V^2 + G2 \cdot \dot{\theta} \cdot V^2$.

The lateral distances Lf and Lr may be determined based upon an amount such as $G1·\theta·V^2+G2·\dot{\theta}·V^2$, wherein $\theta$ and V are the steering angle and the vehicle speed, respectively, while G1 and G2 are gains for such values as $\theta·V^2$ and $\dot{\theta}·V^2$, such as to be Lqf and Kqr showing such performances as shown in FIG. 20. The general performances of Lqf and Lqr relative to such a parameter as $G1·\theta·V^2+G2·\dot{\theta}·V^2$ will be apparent from the map.

Figure 21:
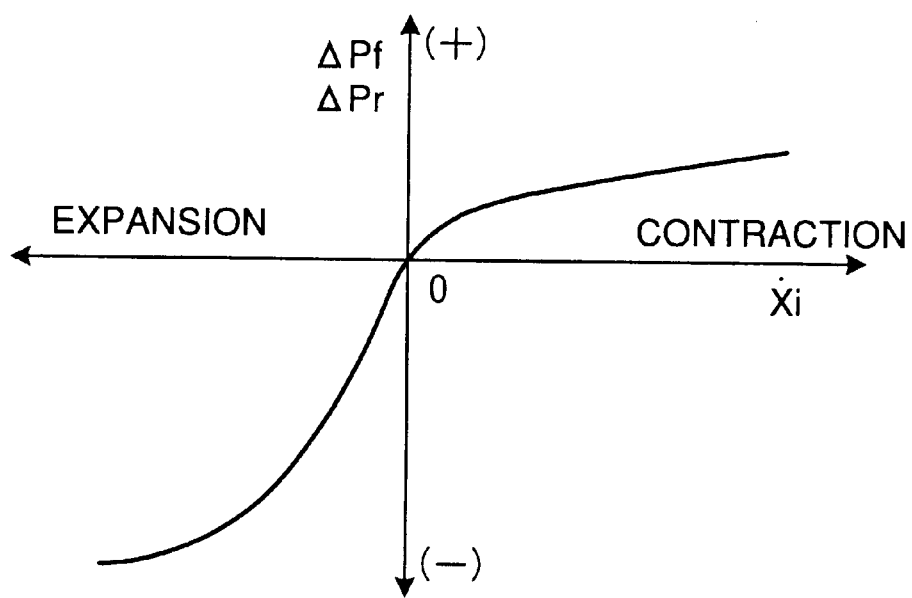
FIG. 21 is a map for obtaining mean pressure values ΔPf and ΔPr based upon vertical accelerations $\ddot{X}i$.
Figure 22:
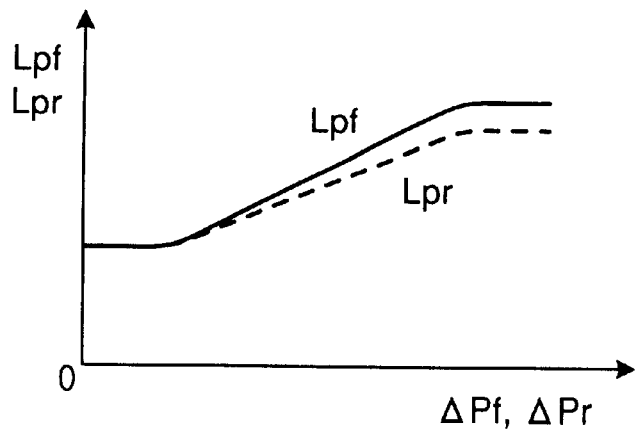
FIG. 22 is a map for obtaining lateral distances Lqf and Lqr based upon ΔPf and ΔPr.

The lateral distances Lf and Lr may be determined based upon the forces acting in the front shock absorbers 22FL and 22FR and the rear shock absorbers 22RL and 22RR, respectively. For this purpose, the forces acting at the respective shock absorbers 22FL-22RR are estimated based upon the vertical stroke velocities $\dot{X}i$ (i=fin, fout, rin and rout) obtained by differentiating the vertical strokes Xj (i=fin, fout, rin and rout) detected by the vertical stroke sensors 26FL-26RR or integrating the vertical accelerations $\ddot{X}i$ (i=fin, fout, rin and rout) detected by the vertical acceleration sensors 28FL-28RR. Then, by looking at a map such as shown in FIG. 21, pressure differences ΔPf and ΔPr are read out as mean values of the pressures generated across the pistons (not shown) of the front shock absorbers 22FL and 22FR and the rear shock absorbers 22RL and 22RR, representing the forces acting thereon based upon a particular design of shock absorbers concerned. Then, the lateral distances Lf and Lr may be obtained as Lpf and Lpr by looking at a map such as shown in FIG. 22. The performances of Lpf and Lpr relative to ΔPf and ΔPr will be apparent from the map.

The lateral distances Lf and Lr may further be modified according to a side sliding condition of the vehicle. For this purpose, first a side slide acceleration is calculated as a difference between the lateral acceleration Gy detected by the lateral acceleration sensor 30 and a product of the vehicle speed V detected by the vehicle speed sensor 32 and the yaw rate γ detected by the yaw rate sensor 36, such as Gy−Vγ. Then, by integrating Gy−Vγ on a time basis, a side slide velocity is obtained. Then, by dividing such a side slide velocity by a longitudinal velocity, i.e. the vehicle speed, a value β of the so-called slip angle is obtained.

Figure 23:
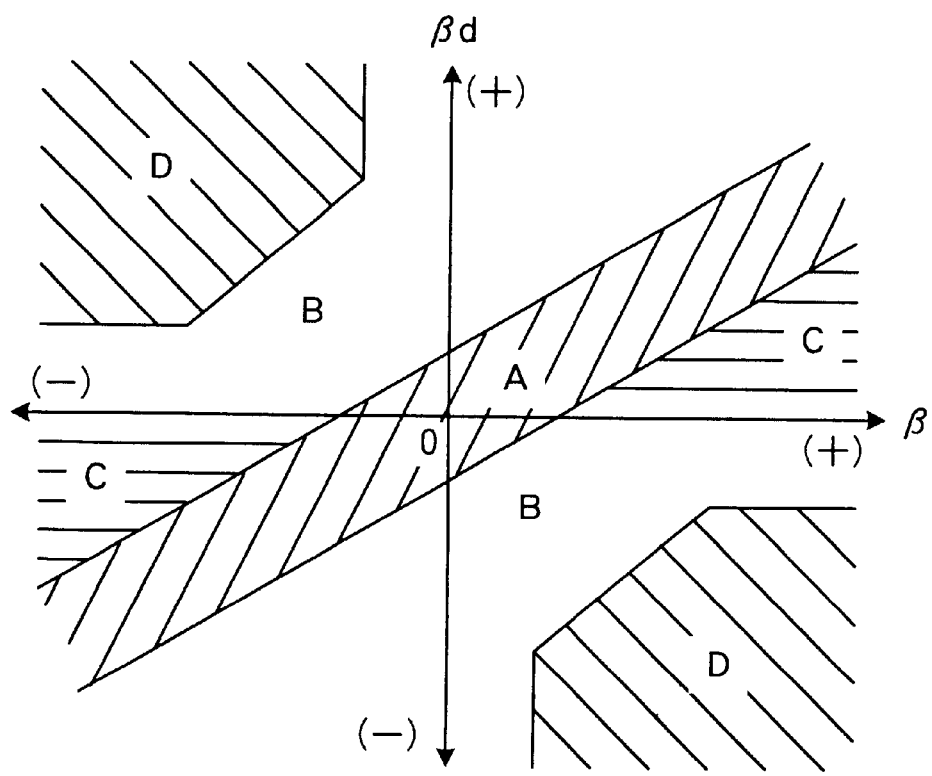
FIG. 23 is a map for discriminating slip states area A, B, C and D.
Figure 24A:
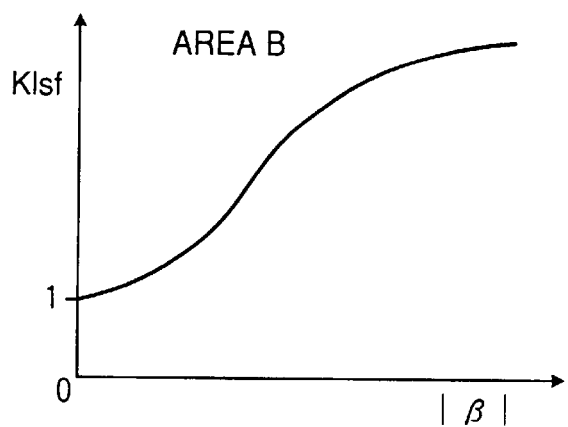
FIGS. 24A, 24B and 24C are maps for obtaining Klst and Klsr based upon slip angle β and slip state area.
Figure 24B:
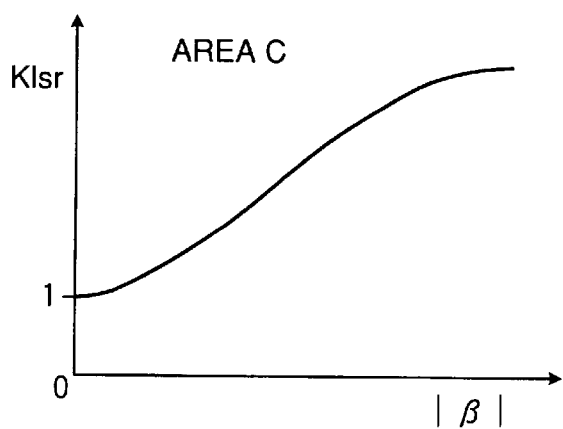
Figure 24C:
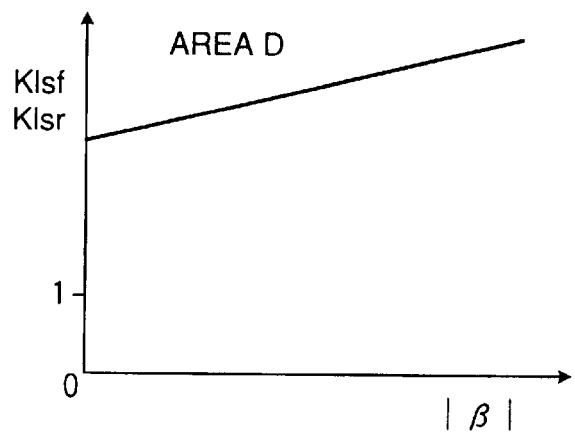

Then, based upon the slip angle β and its change rate $\dot{\beta}$, the running state of the vehicle is discriminated among a stable state, an oversteering state, an understeering state and a dissipating state, as shown by areas A, B, C and D, respectively, in FIG. 23. Modification factors Klsf and Klsr to be multiplied to the standard or otherwise modified lateral distances Lf and Lr are determined according to the absolute value of the slip angle β and the discriminated running state as follows:

When the vehicle is running in the stable area A, Klsf and Klsr are made 1, respectively. When the vehicle is running in the oversteering area B, Klsr for Lr is kept at 1, while Klsf for Lf is increased starting from 1 according to an increase of β as shown in FIG. 24A. When the vehicle is running in the understeering area C, Klsf for Lf is kept at 1, while Klsr for Lr is increased starting from 1 according to an increase of β as shown in FIG. 24B. When the vehicle is running in the dissipating area D, Klsf and Kisr for Lf and Lr are both increased starting from a value substantially larger than 1 according to an increase of β as shown in FIG. 24C. The performances of Klsf and Klsr relative to the absolute value of β will be apparent from the maps.

The first and second phantom damping coefficients Cg and Ca may further be modified against a rolling of the body of a vehicle consonant to a slalom driving of the vehicle.

Figure 25:
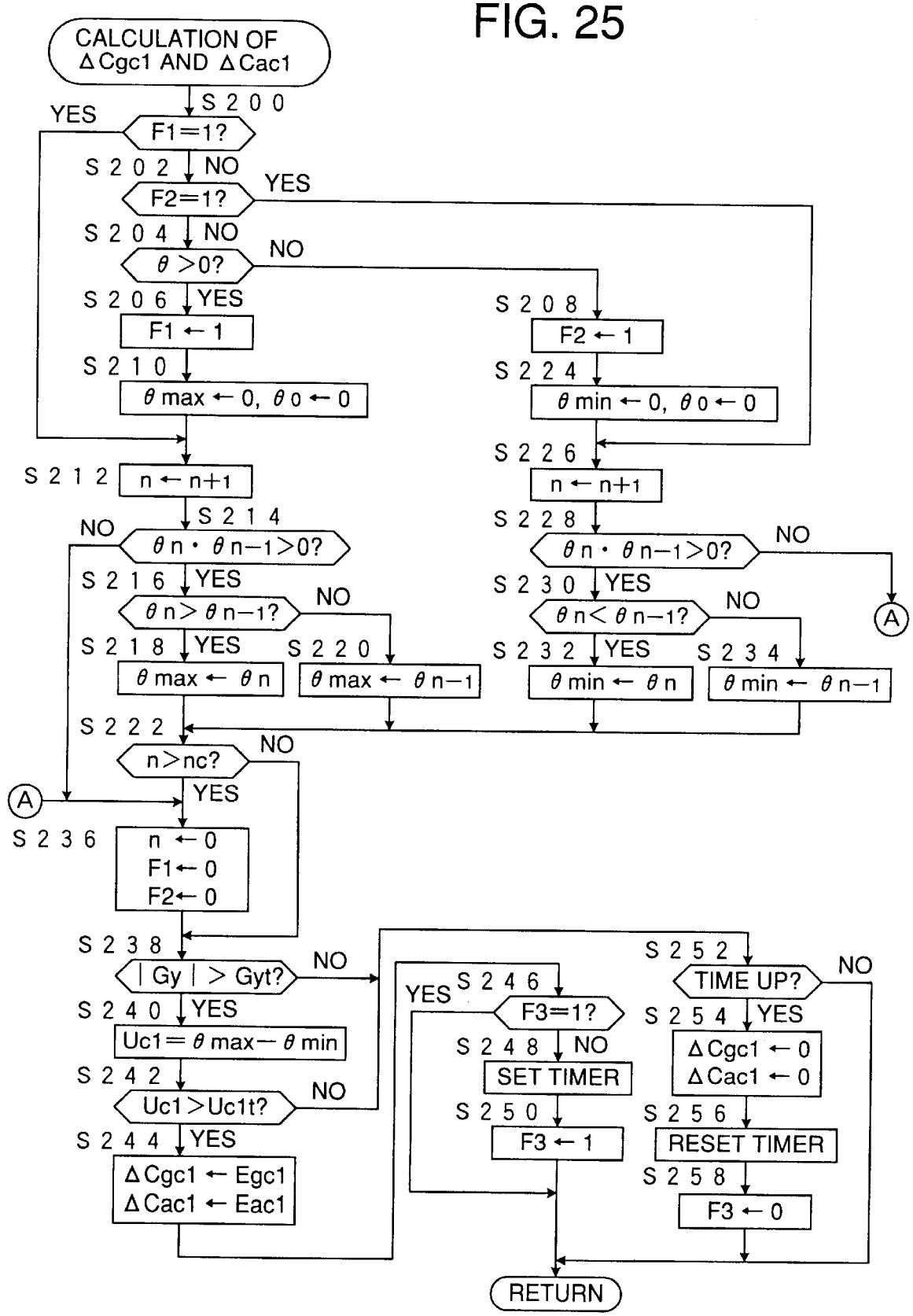
FIG. 25 is a flowchart for obtaining modification amounts ΔCgc1 and ΔCac1 for suppressing a consonant rolling of the vehicle body to a slalom driving based upon steering angle θ.

In an embodiment for such a modification, ΔCgc1 and ΔCac1 for additively modifying Cg and Ca are calculated as shown by a flowchart of FIG. 25.

Referring to FIG. 25, when the damping control is started, in step 200, it is judged if a flag F1 described hereinbelow is 1. As well known in the art, flags like this are normally reset to zero at each start of the control. When the answer is no, the control proceeds to step 202, while when the answer is yes, the control proceeds to step 212 described hereinbelow.

In step 202, it is judged if a flag F2 described hereinbelow is 1. When the answer is yes, the control proceeds to step 226 described hereinbelow, while when the answer is no, the control proceeds to step 204, and it is judged if the steering angle θ detected by the steering sensor 34 is positive. The steering angle θ is made positive when the vehicle is steered for a left turn, while θ is made negative when the vehicle is steered for a right turn. When the answer is yes, the control proceeds to step 206, while when the answer is no, the control proceeds to step 208 described hereinbelow In step 206, the flag F1 is set to 1, and the control proceeds to step 210, wherein values of θ max and θo described hereinbelow are reset to zero.

Instep 212, a count number n initially reset to zero at each start of the control is incremented by 1. What is counted by n will be described hereinbelow.

In step 214, it is judged if θn·θn−1 is positive. θn is the value of the steering angle θ detected by the steering sensor 34 at the instant of the current scanning cycle passing through step 214 with the count number n processed in the preceding step 212. Therefore, θn−1 means the steering angle θ detected by the steering sensor 34 at the moment of the control proceeding through step 214 in the one preceding cycle of scanning through the flowchart. When θn·θn−1 is positive, it may be assumed that the steering of the vehicle remains in a left turn, while when θn·θn−1 is negative, it may be assumed that the steering was changed from a left turn to a right turn across a neutral position. When the answer is yes, the control proceeds to step 216, while when the answer is no, the control proceeds to step 236 described hereinbelow.

In step 216, it is judged if θn is larger than θn−1. When the answer is yes, the control proceeds to step 218, and θ max is made to be θn, while when the answer is no, the control proceeds to step 220, and θ max is made to be θn−1. Therefore, it will be noted that by steps 216, 218 and 220, the largest of a series of θn, θn−1, θn−2, . . . is selected for θ max.

In step 222, it is judged if the count number n is larger than a threshold value nc predetermined therefor. The threshold count number nc is determined in relation with the cycle time of the scanning control through this flowchart so as to count a time duration corresponding to a half of a cycle period of a consonant rolling of the vehicle body.

Returning to step 208, when the control comes to this step, the flag F2 is set to 1. This branch path is prepared for a right turn of the vehicle.

In step 224, values of θmin and θo described hereinbelow are reset to zero, respectively. Then, in step 226, the count number n is incremented by 1.

In step 228, it is judged if θn·θn−1 is positive. When θn·θn−1 is positive, it may be assumed that the steering of the vehicle remains in a right turn, while when θn·θn−1 is negative, it may be assumed that the steering was changed from a right turn to a left turn across a neutral position. When the answer is yes, the control proceeds to step 230, while when the answer is no, the control proceeds to step 236.

In step 230, it is judged if θn is smaller than θn−1. When the answer is yes, the control proceeds to step 232, and θmin is made θn, while when the answer is no, the control proceeds to step 234, and θ min is made to be θn−1. Therefore, it will be noted that by steps 230, 232 and 234, the smallest of a series of θn, θn−1, θn−2, . . . is selected for θ min.

Coming again to step 222, when the answer is yes, the control proceeds to step 236, wherein the count number n is reset to zero, and the flags F1 and F2 are also reset to zero. When the answer of step 222 is no, the control bypasses step 236 to come to step 238. On the other hands, as described above, step 236 is also reached from step 214 or 228 when θn·θn−1 is negative, i.e. when the steering was changed from a left turn to a right turn or from a right turn to a left turn across the neutral. Therefore, it will be note that when a slalom driving is synchronized with the consonant rolling frequency of the vehicle body, the threshold count number nc is counted up with a detection of the largest value of the steering angle θ in a left turn or the smallest value of the steering angle θ (largest in the absolute value) in a right turn during the slalom driving.

In step 238, it is judged if the absolute value of the lateral acceleration Gy detected by the lateral acceleration sensor 30 is larger than a threshold value Gyt predetermined therefor in order to determined whether or not to carry out the modification of Cg and Ca against a rolling of the body of the vehicle consonant to a slalom driving. When the answer is yes, the control proceeds to step 240, while when the answer is no, the control proceeds to step 252 described hereinbelow.

In step 240, a sum of the absolute values of θmax and θmin is calculated as Uc1, such as Uc1=θmax−θmin. Then, in step 242, it is judged if Uc1 is larger than a threshold value Uc1t predetermined therefor in order to still determine whether or not to carry out the modification of Cg and Ca against a rolling of the vehicle body consonant to a slalom driving. When the answer is yes, the control proceeds to step 244, while when the answer is no, the control proceeds to step 252.

In step 244, modification amounts ΔCgc1 and ΔCac1 for Cg and Ca against a rolling of the body of the vehicle consonant to a slalom driving are respectively made Egc1 and Eac1 appropriately determined therefor.

In step 246, it is judged if a flag F3 is 1. The flag F3 is initially reset to zero at each start of the control. When the answer is no, the control proceeds to step 248, and a timer is set. Then, in step 250, the flag F3 is set to 1. Then the control returns to step 200. When the answer of step 246 is yes, i.e. after the timer was once set up, the control bypasses steps 248 and 250.

In step 252, it is judged if the timer started in step 248 has counted up a time preset therein. When the answer is no, the control returns to step 200. When the answer is yes, the control proceeds to step 254, and the modification amounts ΔCgc1 and ΔCac1 are set to zero. Then, in step 256, the timer is reset, and then, in step 258, the flag F3 is reset to zero. Then the control returns to step 200.

Thus, it will be appreciated that according to this embodiment, the modification amounts ΔCgc1 and ΔCac1 for Cg and Ca against a rolling of the vehicle body consonant to a slalom driving are made substantial amounts such as Egc1 and Eac1, respectively, when the absolute value of the lateral acceleration is larger than a threshold value predetermined therefor, and further the steering wheel is turned alternately leftward and rightward so much across the neutral point in a slaloming manner at a frequency around a consonant rolling frequency of the vehicle body that a sum of the absolute angles of a largest leftward steering and a largest rightward steering exceeds a threshold value predetermined therefor, wherein ΔCgc1 and ΔCac1 are respectively set at such values as Egc1 and Eac1 until such a consonant slalom steering is stopped or at least a predetermined time lapses when once so set.

The values of Egc1 and Eac1 may be varied according to the magnitude of the sum of the absolute angles of the largest leftward steering and the largest rightward steering by looking at an appropriate map not shown. Further, the values of ΔCgc1 and ΔCac1 thus obtained may be appropriately shared between the front and rear halves of the phantom damping system according to such arts as described with reference to FIGS. 13A and 13B, 16A–16C, 17A–17C, 18A–18C or 19A–19C, or any other arts.

Additive modification amounts for Cg and Ca against a rolling of the vehicle body consonant to a slalom driving of the vehicle may be obtained based upon the lateral acceleration of the vehicle body. FIG. 26 is a flowchart similar to FIG. 25, showing such an embodiment for obtaining modification amounts denoted ΔCgc2 and ΔCac2 based upon the lateral acceleration of the vehicle body. The modification amounts ΔCgc2 and ΔCac2 of this embodiment are obtained according to the same technical concept as in the embodiment shown in FIG. 25, except that the slalom is processed based upon the lateral acceleration Gy detected by the lateral acceleration sensor 30, instead of the steering angle θ in the former embodiment. Therefore, for the sake of convenience of review, steps in FIG. 26 corresponding to those in FIG. 25 are numbered to be larger by 100 than those in FIG. 25.

When the control is started, in step 300, it is judged if a flag F4 is set to 1. When the answer is no, the control proceeds to step 302, while when the answer is yes, the control proceeds to step 312.

In step 302, it is judged if a flag F5 is 1. When the answer is yes, control proceeds to step 326, while when the answer is no, the control proceeds to step 304, and it is judged if the lateral acceleration Gy detected by the lateral acceleration sensor 30 is positive. As already described with reference to step 20 of FIG. 5, the lateral acceleration Gy is made positive when it is directed leftward of the vehicle as in a left turn of the vehicle, while Gy is made negative when it is directed rightward of the vehicle as in a right turn of the vehicle. When the answer is yes, the control proceeds to step 306, while when the answer is no, the control proceeds to step 308.

In step 306, the flag F4 is set to 1, and the control proceeds to step 310, wherein values of Gymax and Gyo described hereinbelow are reset to zero.

Instep 312, a count number n initially reset to zero at each start of the control is incremented by 1. What is counted by n is the same as in the flowchart of FIG. 25.

In step 314, it is judged if Gyn·Gyn−1 is positive. Gyn is the value of the lateral acceleration Gy detected by the lateral acceleration sensor 30 at the instant of the current scanning cycle passing through step 314 with the count number n processed in the preceding step 312. Therefore, Gyn−1 means the lateral acceleration Gy detected by the lateral acceleration sensor 30 at the moment of the control proceeding through step 314 in the one preceding cycle of scanning through the flowchart. When Gyn·Gyn−1 is positive, it may be assumed that the turning of the vehicle remains in a left turn, while when Gyn·Gyn−1 is negative, it may be assumed that the direction of the turn was changed from a left turn to a right turn across a neutral position. When the answer is yes, the control proceeds to step 316, while when the answer is no, the control proceeds to step 336 described hereinbelow.

In step 316, it is judged if Gyn is larger than Gyn−1. When the answer is yes, the control proceeds to step 318, and Gymax is made to be Gyn, while when the answer is no, the control proceeds to step 320, and Gymax is made to be Gyn−1. Therefore, it will be noted that by steps 316, 318 and 320, the largest of a series of Gyn, Gyn−1, Gyn−2, . . . is selected for Gymax.

In step 322, it is judged if the count number n is larger than a threshold value nc predetermined therefor. As is the same as nc in step 220 of the flowchart of FIG. 25, the threshold count number nc is determined in relation with the cycle time of the scanning control through this flowchart so as to count a time duration corresponding to a half of a cycle period of a consonant rolling of the vehicle body.

Returning to step 308, when the control comes to this step, the flag F5 is set to 1. This branch path is prepared for a right turn of the vehicle.

In step 324, values of Gymin and Gyo described hereinbelow are reset to zero, respectively. Then, in step 326, the count number n is incremented by 1.

In step 328, it is judged if Gyn·Gyn−1 is positive. When Gyn·Gyn−1 is positive, it may be assumed that the turning of the vehicle remains in a right turn, while when Gyn·Gyn−1 is negative, it may be assumed that the direction of the turning was changed from a right turn to a left turn across a neutral position. When the answer is yes, the control proceeds to step 330, while when the answer is no, the control proceeds to step 336.

In step 330, it is judged if Gyn is smaller than Gyn−1. When the answer is yes, the control proceeds to step 332, and Gymin is made to be Gyn, while when the answer is no, the control proceeds to step 334, and Gymin is made to be Gyn−1. Therefore, it will be noted that by steps 330, 332 and 334, the smallest of a series of Gyn, Gyn−1, Gyn−2, ... is selected for Gymin.

Coming again to step 322, when the answer is yes, the control proceeds to step 336, wherein the count number n is reset to zero, and the flags F4 and F5 are also reset to zero. When the answer of step 322 is no, the control bypasses step 336 to come to step 338. On the other hands, as described above, step 336 is also reached from step 314 or 328 when Gyn·Gyn−1 is negative, i.e. when the turning direction was changed from a left turn to a right turn or from a right turn to a left turn across the neutral. Therefore, it will be note that when a slalom driving is synchronized with the consonant rolling frequency of the vehicle body, the threshold count number nc is counted up with a detection of the largest value of the lateral acceleration Gy in a left turn or the smallest value of the lateral acceleration Gy (largest in the absolute value) in a right turn during the slaloming driving.

In step 338, it is judged if the absolute value of the lateral acceleration Gy is larger than a threshold value Gyt predetermined therefor in order to determined whether or not to carry out the modification of Cg and Ca against a rolling of the body of the vehicle consonant to a slalom driving. When the answer is yes, the control proceeds to step 340, while when the answer is no, the control proceeds to step 352 described hereinbelow.

In step 340, a sum of the absolute values of Gymax and Gymin is calculated as Uc2, such as Uc2=Gymax−Gymin. Then, in step 342, it is judged if Us2 is larger than a threshold value Uc2t predetermined therefor in order to still determine whether or not to carry out the modification of Cg and Ca against a rolling of the vehicle body consonant to a slalom driving. When the answer is yes, the control proceeds to step 344, while when the answer is no, the control proceeds to step 352.

In step 344, modification amounts $\Delta Cgc2$ and $\Delta Cac2$ for Cg and Ca against a rolling of the vehicle body consonant to a slalom driving are respectively made Egc2 and Eac2 appropriately determined therefor.

In step 346, it is judged if a flag F6 is 1. The flag F6 is initially reset to zero at each start of the control. When the answer is no, the control proceeds to step 348, and a timer is set. Then, in step 350, the flag F6 is set to 1. Then the control returns to step 300. When the answer of step 346 is yes, i.e. after the timer was once set, the control bypasses steps 348 and 350.

In step 352, it is judged if the timer started in step 348 has counted up a time preset therein. When the answer is no, the control returns to step 300. When the answer is yes, the control proceeds to step 354, and the modification amounts $\Delta Cgc2$ and $\Delta Cac2$ are reset to zero. Then, in step 356, the timer is reset, and then, in step 358, the flag F6 is reset to zero. Then the control returns to step 300.

Thus, it will also be appreciated that according to this embodiment, the modification amounts $\Delta Cgc2$ and $\Delta Cac2$ for Cg and Ca against a rolling of the vehicle body consonant to a slalom driving are made substantial amounts such as Egc2 and Eac2, respectively, when the absolute value of the lateral acceleration is larger than a threshold value predetermined therefor, and further the lateral acceleration changes alternately leftward and rightward so much across the neutral in a slaloming manner at a frequency around a consonant rolling frequency of the vehicle body that a sum of the absolute values of a largest leftward lateral acceleration and a largest rightward lateral acceleration exceeds a threshold value predetermined therefor, wherein $\Delta Cgc2$ and $\Delta Cac2$ are respectively set at such values as Egc2 and Eac2 until such a consonant slalom steering is stopped or at least a predetermined time lapses when once so set.

The values of Egc2 and Eac2 may also be varied according to the magnitude of the sum of the absolute values of the largest leftward lateral acceleration and the largest rightward lateral acceleration by looking at an appropriate map not shown. Further, the values of $\Delta Cgc2$ and $\Delta Cac2$ thus obtained may also be appropriately shared between the front and rear halves of the phantom damping system according to such arts as described with reference to FIGS. 13A and 13B, 16A–16C, 17A–17C, 18A–18C or 19A–19C, or any other arts.

Figure 27A:
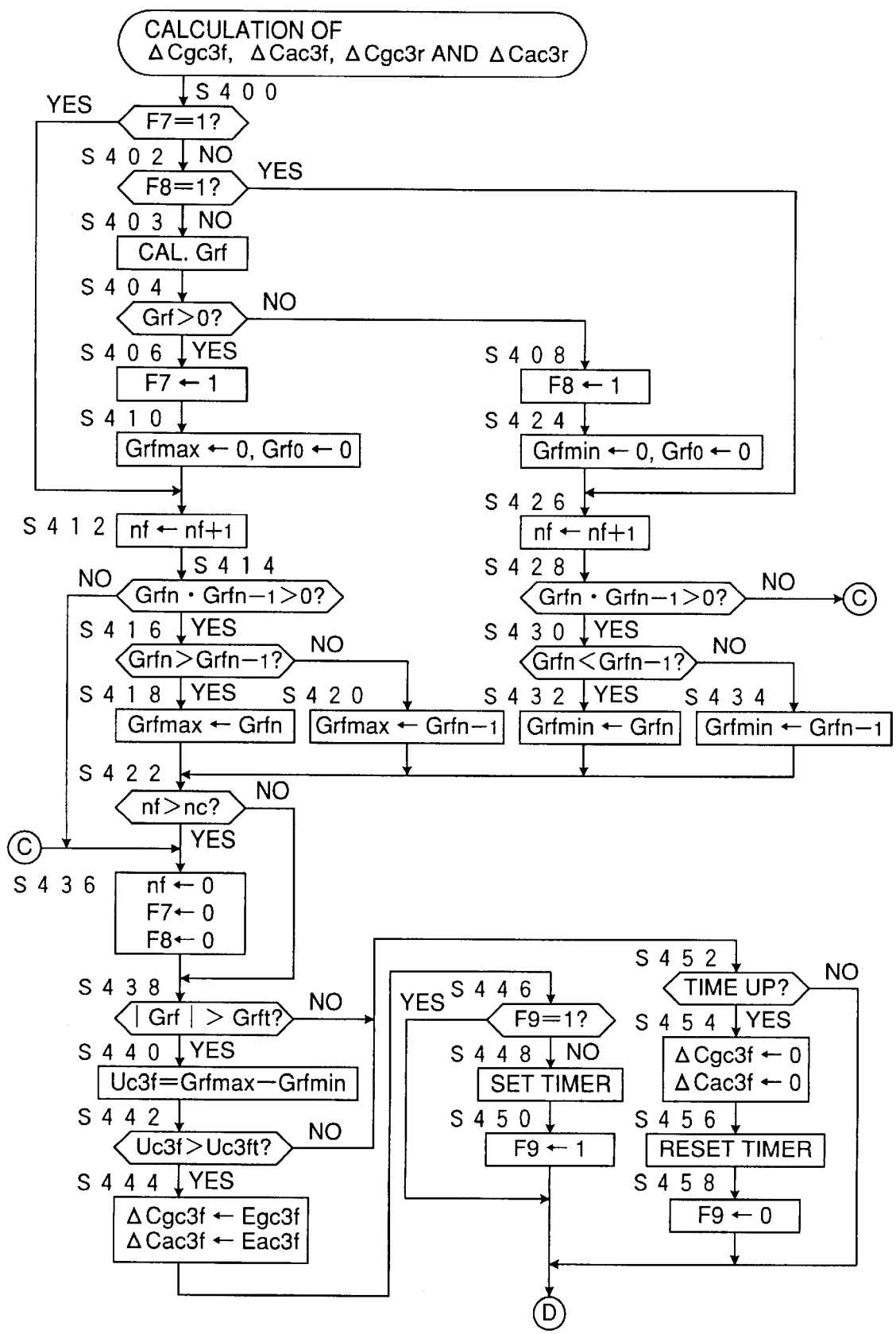
FIGS. 27A and 27B are flowcharts to be combined for obtaining modification amounts ΔCgc3f, ΔCac3f and ΔCgc3r, ΔCac3r for suppressing a consonant rolling of the vehicle body to a slalom driving based upon rolling accelerations of the vehicle body.
Figure 27B:
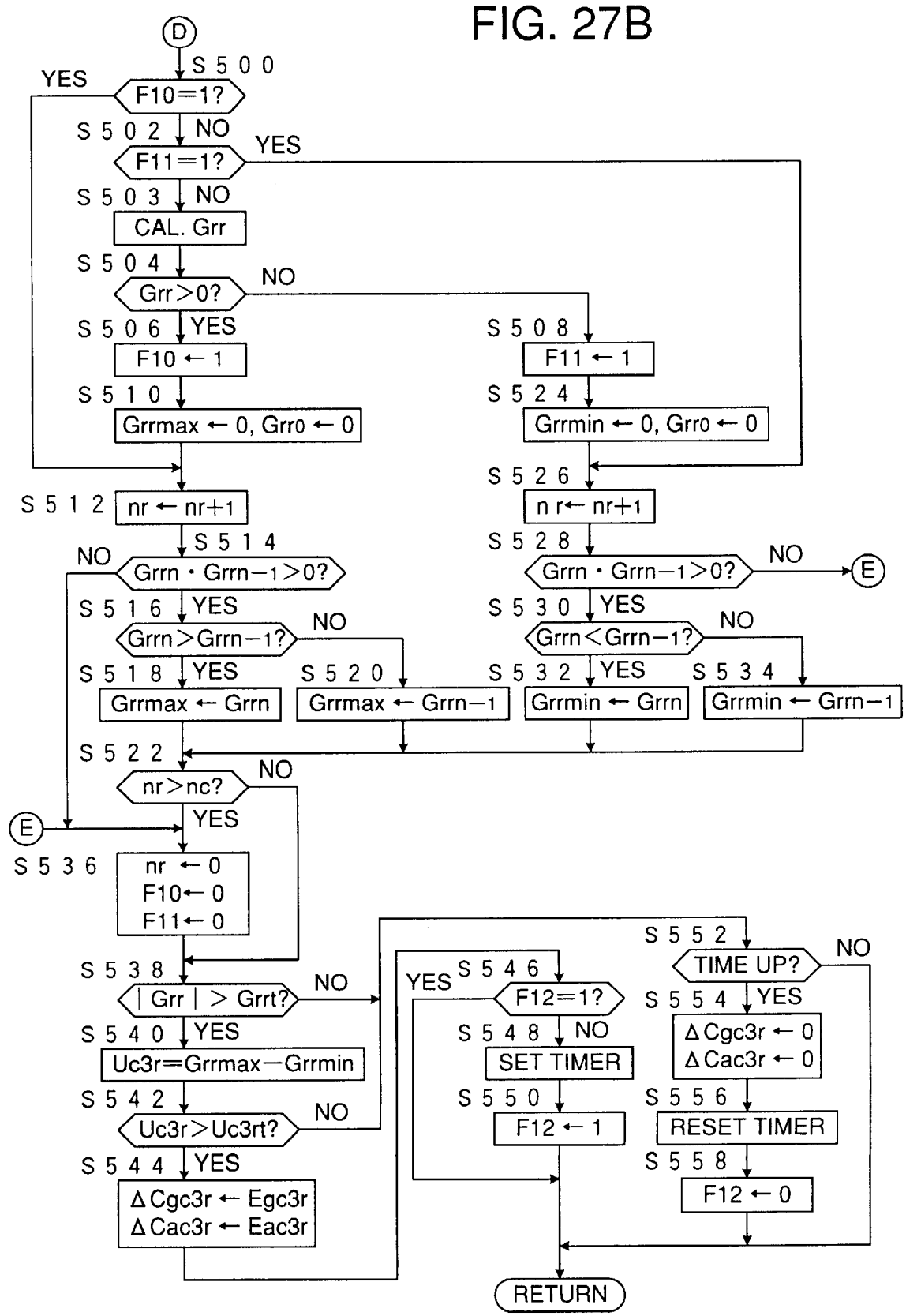

Additive modification amounts against a rolling of the vehicle body consonant to a slalom driving of the vehicle may be obtained based upon rolling acceleration of the vehicle body. FIGS. 27A and 27B present in combination a flowchart similar to FIG. 25 or 26, showing such an embodiment for obtaining modification amounts denoted as $\Delta Cgc3f$, $\Delta Cgc3r$, and $\Delta Cac3f$, $\Delta Cac3r$ based upon the rolling acceleration of the vehicle body. The modification amounts of this embodiment are also obtained according to the same technical concept as in the embodiments shown in FIGS. 25 and 26, except that the slalom is separately processed based upon rolling accelerations of the front and rear portions of the vehicle body corresponding to the pair of front and rear wheels. The rolling accelerations of the front and rear portions of the vehicle are available from the output signals of the vertical acceleration sensors 28FL, 28FR, 28RL and 28RR indicating up and down accelerations $\ddot{X}fin$, $\ddot{X}fout$, $\ddot{X}rin$ and $\ddot{X}rout$ of body portions vertically above the corresponding wheels.

Also for the sake of convenience of review, steps in FIG. 27A for the front portion of the vehicle body corresponding to those in FIG. 25 or 26 are numbered to be larger by 200 or 100 than those in FIG. 25 or 26, respectively, and steps in FIG. 27B for the rear portion of the vehicle body corresponding to those in FIG. 25 or 26 are numbered to be larger by 300 or 200 than those in FIG. 25 or 26, respectively.

Referring to FIG. 27A for obtaining the modification amounts $\Delta Cgc3f$ and $\Delta Cac3f$ for Cgf and Caf, when the control is started, in step 400, it is judged if a flag F7 is set to 1. When the answer is no, the control proceeds to step 402, while when the answer is yes, the control proceeds to step 412.

In step 402, it is judged if a flag F8 is 1. When the answer is yes, control proceeds to step 426, while when the answer is no, the control proceeds to step 403, and a rolling acceleration of the front portion of the vehicle body, denoted as Grf, is calculated based upon the vertical accelerations $\ddot{X}$fin and $\ddot{X}$fout of the portions of the vehicle body vertically above the front wheels inside and outside of a turn detected by the vertical acceleration sensors 28FL and 28FR, respectively, as Grf=($\ddot{X}$fin−$\ddot{X}$fout)/Wf.

In step 404, it is judged if the rolling acceleration Grf is positive. In analogy with the lateral acceleration, the rolling acceleration Grf is made positive when it is directed clockwise as viewed from the back of the vehicle as in a left turn of the vehicle, while Grf is made negative when it is directed counter-clockwise as viewed from the back of the vehicle as in a right turn of the vehicle. When the answer is yes, the control proceeds to step 406, while when the answer is no, the control proceeds to step 408.

In step 406, the flag F7 is set to 1, and the control proceeds to step 410, wherein values of Grfmax and Grfo described hereinbelow are reset to zero.

In step 412, a count number nf initially reset to zero at each start of the control is incremented by 1. What is counted by nf is the same as in the flowchart of FIG. 25 or 26.

In step 414, it is judged if Grfn−Grfn−1 is positive. Grfn is the value of the rolling acceleration Grf calculated in step 403 at the instant of the current scanning cycle passing through step 414 with the count number nf processed in the preceding step 412. Therefore, Grfn−1 means the rolling acceleration Grf calculated in step 403 at the moment of the control proceeding through step 414 in the one preceding cycle of scanning through the flowchart. When Grfn·Grfn−1 is positive, it may be assumed that the turning of the vehicle remains in a left turn, while when Grfn·Grfn−1 is negative, it may be assumed that the direction of the turn was changed from a left turn to a right turn across a neutral position. When the answer is yes, the control proceeds to step 416, while when the answer is no, the control proceeds to step 436 described hereinbelow.

In step 416, it is judged if Grfn is larger than Grfn−1. When the answer is yes, the control proceeds to step 418, and Grfmax is made to be Grfn, while when the answer is no, the control proceeds to step 420, and Grfmax is made to be Grfn−1. Therefore, it will be noted that by steps 416, 418 and 420, the largest of a series of Grfn, Grfn−1, Grfn−2, . . . is selected for Grfmax.

In step 422, it is judged if the count number nf is larger than a threshold value nc predetermined therefor. As is the same as nc in step 220 of the flowchart of FIG. 25, or nc in step 320 of the flowchart of FIG. 26, the threshold count number nc is determined in relation with the cycle time of the scanning control through this flowchart so as to count a time duration corresponding to a half of a cycle period of a consonant rolling of the vehicle body.

Returning to step 408, when the control comes to this step, the flag F8 is set to 1. This branch path is prepared for a right turn of the vehicle.

In step 424, values of Grfmin and Grfo described hereinbelow are also reset to zero, respectively. Then, in step 426, the count number nf is incremented by 1.

In step 428, it is judged if Grfn·Grfn−1 is positive. When Grfn·Grfn−1 is positive, it may be assumed that the turning of the vehicle remains in a right turn, while when Grfn·Grfn−1 is negative, it may be assumed that the direction of the turning was changed from a right turn to a left turn across a neutral position. When the answer is yes, the control proceeds to step 430, while when the answer is no, the control proceeds to step 436.

In step 430, it is judged if Grfn is smaller than Grfn−1. When the answer is yes, the control proceeds to step 432, and Grfmin is made to be Grfn, while when the answer is no, the control proceeds to step 434, and Grfmin is made to be Grfn−1. Therefore, it will be noted that by steps 430, 432 and 434, the smallest of a series of Grfn, Grfn−1, Grfn−2, . . . is selected for Grfmin.

Coming again to step 422, when the answer is yes, the control proceeds to step 436, wherein the count number nf is reset to zero, and the flags F7 and F8 are also reset to zero. When the answer of step 422 is no, the control bypasses step 436 to come to step 438. On the other hands, as described above, step 436 is also reached from step 414 or 428 when Grfn·Grfn−1 is negative, i.e. when the turning direction was changed from a left turn to a right turn or from a right turn to a left turn across the neutral. Therefore, it will be note that when a slalom driving is synchronized with the consonant rolling frequency of the vehicle body, the threshold count number nc is counted up with a detection of the largest value of the rolling acceleration Grf in a left turn or the smallest value of the rolling acceleration Grf (largest in the absolute value) in a right turn during the slaloming driving.

In step 438, it is judged if the absolute value of the rolling acceleration Grf is larger than a threshold value Grft predetermined therefor in order to determined whether or not to carry out the modification of Cgf and Caf against a rolling of the front portion of the vehicle body consonant to a slalom driving. When the answer is yes, the control proceeds to step 440, while when the answer is no, the control proceeds to step 452 described hereinbelow.

In step 440, a sum of the absolute values of Grfmax and Grfmin is calculated as Uc3, such as Uc3=Grfmax−Grfmin. Then, in step 442, it is judged if Uc3 is larger than a threshold value Uc3t predetermined therefor in order to still determine whether or not to carry out the modification of Cgf and Caf against a rolling of the front portion of the vehicle body consonant to a slalom driving. When the answer is yes, the control proceeds to step 444, while when the answer is no, the control proceeds to step 452.

In step 444, modification amounts ΔCgc3f and ΔCac3f for Cgf and Caf against a rolling of the front portion of the vehicle body consonant to a slalom driving are made Egc3f and Eac3f appropriately determined therefor.

In step 446, it is judged if a flag F9 is 1. The flag F9 is initially reset to zero at each start of the control. When the answer is no, the control proceeds to step 448, and a timer is set. Then, in step 450, the flag F9 is set to 1. Then the control proceeds to step 500. When the answer of step 446 is yes, i.e. after the timer was once set, the control bypasses steps 448 and 450.

In step 452, it is judged if the timer started in step 448 has counted up a time preset therein. When the answer is no, the control proceeds to step 500. When the answer is yes, the control proceeds to step 454, and the modification amounts ΔCgc3f and ΔCac3f are reset to zero. Then, in step 456, the timer is reset, and then, in step 458, the flag F9 is reset to zero. Then the control proceeds to step 500.

Continuing to the steps of FIG. 27A, referring to FIG. 27B for obtaining the modification amounts ΔCgc3r and ΔCac3r for Cgr and Car, in step 500, it is judged if a flag F10 is set to 1. When the answer is no, the control proceeds to step 502, while when the answer is yes, the control proceeds to step 512.

In step 502, it is judged if a flag F11 is 1. When the answer is yes, control proceeds to step 526, while when the answer is no, the control proceeds to step 503, and a rolling acceleration of the rear portion of the vehicle body, denoted as Grr, is calculated based upon the vertical accelerations $\ddot{X}$rl and $\ddot{X}$rr of the portions of the vehicle body vertically above the rear left and rear right wheels detected by the vertical acceleration sensors 28RL and 28RR, respectively, as Grr=($\ddot{X}$rin−$\ddot{X}$rout)/Wr.

In step 504, it is judged if the rolling acceleration Grr is positive. The rolling acceleration Grr is also made positive when it is directed clockwise as viewed from the back of the vehicle as in a left turn of the vehicle, while Grr is made negative when it is directed counter-clockwise as viewed from the back of the vehicle as in a right turn of the vehicle. When the answer is yes, the control proceeds to step 506, while when the answer is no, the control proceeds to step 508.

In step 506, the flag F10 is set to 1, and the control proceeds to step 510, wherein values of Grrmax and Grro described hereinbelow are reset to zero.

Instep 512, a count number nr initially reset to zero at each start of the control is incremented by 1. What is counted by nr is the same as in the flowchart of FIG. 25 or 26.

In step 514, it is judged if Grrn·Grrn−1 is positive. Grrn is the value of the rolling acceleration Grr calculated in step 503 at the instant of the current scanning cycle passing through step 514 with the count number nr processed in the preceding step 512. Therefore, Grrn−1 means the rolling acceleration Grr calculated in step 503 at the moment of the control proceeding through step 514 in the one preceding cycle of scanning through the flowchart. When Grrn·Grrn−1 is positive, it may be assumed that the turning of the vehicle remains in a left turn, while when Grrn·Grrn−1 is negative, it may be assumed that the direction of the turn was changed from a left turn to a right turn across a neutral position. When the answer is yes, the control proceeds to step 516, while when the answer is no, the control proceeds to step 536 described hereinbelow.

In step 516, it is judged if Grrn is larger than Grrn−1. When the answer is yes, the control proceeds to step 518, and Grrmax is made to be Grrn, while when the answer is no, the control proceeds to step 520, and Grrmax is made to be Grrn−1. Therefore, it will be noted that by steps 516, 518 and 520, the largest of a series of Grrn, Grrn−1, Grrn−2, . . . is selected for Grrmax.

In step 522, it is judged if the count number nr is larger than the threshold value nc which is the same count number as used in step 422.

Returning to step 508, when the control comes to this step, the flag F11 is set to 1. This branch path is prepared for a right turn of the vehicle.

In step 524, values of Grrmin and Grro described hereinbelow are also reset to zero, respectively. Then, in step 526, the count number nr is incremented by 1.

In step 528, it is judged if Grrn·Grrn−1 is positive. When Grrn·Grrn−1 is positive, it may be assumed that the turning of the vehicle remains in a right turn, while when Grrn·Grrn−1 is negative, it may be assumed that the direction of the turning was changed from a right turn to a left turn across a neutral position. When the answer is yes, the control proceeds to step 530, while when the answer is no, the control proceeds to step 436.

In step 530, it is judged if Grrn is smaller than Grrn−1. When the answer is yes, the control proceeds to step 532, and Grrmin is made to be Grrn, while when the answer is no, the control proceeds to step 534, and Grrmin is made to be Grrn−1. Therefore, it will be noted that by steps 530, 532 and 534, the smallest of a series of Grrn, Grrn−1, Grrn−2, . . . is selected for Grrmin.

Coming again to step 522, when the answer is yes, the control proceeds to step 536, wherein the count number nr is reset to zero, and the flags F10 and F11 are also reset to zero. When the answer of step 522 is no, the control bypasses step 536 to come to step 538. On the other hands, as described above, step 536 is also reached from step 514 or 528 when Grrn·Grrn−1 is negative, i.e. when the turning direction was changed from a left turn to a right turn or from a right turn to a left turn across the neutral. Therefore, it will be note that when a slalom driving is synchronized with the consonant rolling frequency of the vehicle body, the threshold count number nc is counted up with a detection of the largest value of the rolling acceleration Grf in a left turn or the smallest value of the rolling acceleration Grf (largest in the absolute value) in a right turn during the slaloming driving.

In step 538, it is judged if the absolute value of the rolling acceleration Grr is larger than a threshold value Grrt predetermined therefor in order to determined whether or not to carry out the modification of Cgr and Car against a rolling of the rear portion of the vehicle body consonant to a slalom driving. When the answer is yes, the control proceeds to step 540, while when the answer is no, the control proceeds to step 552 described hereinbelow.

In step 540, a sum of the absolute values of Grrmax and Grrmin is calculated as Uc4, such as Uc4=Grrmax−Grrmin. Then, in step 542, it is judged if Uc4 is larger than a threshold value Uc4t predetermined therefor in order to still determine whether or not to carry out the modification of Cgr against a rolling of the rear portion of the vehicle body consonant to a slalom driving. When the answer is yes, the control proceeds to step 544, while when the answer is no, the control proceeds to step 552.

In step 544, modification amounts ΔCgc3r and ΔCac3r for Cgr and Car against a rolling of the rear portion of the vehicle body consonant to a slalom driving are made Egc3r and Eac3r appropriately determined therefor.

In step 546, it is judged if a flag F12 is 1. The flag F12 is initially reset to zero at each start of the control. When the answer is no, the control proceeds to step 548, and a timer is set. Then, in step 550, the flag F12 is set to 1. Then the control returns to step 400. When the answer of step 446 is yes, i.e. after the timer was once set, the control bypasses steps 548 and 450.

In step 552, it is judged if the timer started in step 548 has counted up a time preset therein. When the answer is no, the control returns to step 400. When the answer is yes, the control proceeds to step 554, and the modification amounts ΔCgc3r and ΔCac3r are reset to zero. Then, in step 556, the timer is reset, and then, in step 558, the flag F12 is reset to zero. Then the control returns to step 400.

Thus, it will be appreciated that according to this embodiment, the modification amounts ΔCgc3f and ΔCac3f for Cgf and Caf and ΔCgc3r and ΔCac3r for Cgr and Car against a rolling of the vehicle body consonant to a slalom driving are obtained separately for the front and rear portions of the vehicle body to be made substantial amounts such as Egc3f and Eac3f and Egc3r and Eac3r, respectively, when the absolute values of the rolling acceleration of the front and rear portions of the vehicle are larger than a threshold value predetermined therefor, and further the rolling acceleration changes alternately leftward and rightward so much across the neutral in a slaloming manner at a frequency around a consonant rolling frequencies of the front and rear portions of the vehicle body, respectively, that a sum of the absolute values of a largest clockwise rolling acceleration and a largest counter-clockwise rolling acceleration of the vehicle body as viewed from the back of the vehicle exceeds a threshold value predetermined therefor, wherein ΔCgc3f and ΔCac3f and ΔCgc3r and ΔCac3r are respectively set at such values as Egc3f and Eac3f and Egc3r and Eac3r until such a consonant slalom steering is stopped or at least a predetermined time lapses when once so set.

The values of Egc3f and Eac3f and Egc3r and Eac3r may also be varied according to the magnitude of the sum of the absolute values of the largest clockwise rolling acceleration and the largest counter-clockwise rolling acceleration by looking at an appropriate map not shown.

Although the present invention has been described in detail with respect to a basic preferred embodiment and various modifications thereof, it will be apparent for those skilled in the art that other various modifications are possible with respect to the shown embodiments within the scope of the present invention.

What is claimed is:

1. A device for controlling damping coefficients of shock absorbers of a four wheeled vehicle having a vehicle body, front left, front right, rear left and rear right wheels each supporting the vehicle body at a corresponding portion thereof, and the shock absorbers each acting between each of the wheels and the corresponding portion of the vehicle body, comprising:

means for constructing a phantom damping system composed of a phantom side shock absorber disposed vertically at a lateral inside of a turn running of the vehicle to have a lower end movable along a ground surface together with the vehicle and an upper end vertically movable relative to the lower end with a first phantom damping coefficient therebetween, and a phantom angular shock absorber arranged to act between the upper end of the phantom side shock absorber and the vehicle body with a second phantom damping coefficient therebetween, such that the phantom damping system provides the vehicle body with a substantially same phantom vertical damping force against a vertical movement of the vehicle body and a substantially same phantom angular damping moment against a rolling angular movement of the vehicle body as the shock absorbers acting between the wheels and the corresponding portions of the vehicle during a rolling of the vehicle body due to the turn running of the vehicle;

means for calculating values of at least the first and second phantom damping coefficients for obtaining an optimum rolling performance of the vehicle body by the phantom damping system during the turn running of the vehicle; and means for controlling the damping coefficients of the shock absorbers acting between the wheels and the corresponding portions of the vehicle body based upon the calculated values of the first and second phantom damping coefficients.

2. A device according to claim 1, wherein the phantom damping system constructing means construct the phantom damping system as front and rear halves thereof corresponding separately to the shock absorbers acting between the front left and front right wheels and the corresponding portions of the vehicle body and to the shock absorbers acting between the rear left and rear right wheels and the corresponding portions of the vehicle body.

3. A device according to claim 2, wherein the calculating means further calculate lateral distances of the phantom side and angular shock absorbers of the front and rear halves of the phantom damping system according to a sum of an appropriately gained first product of steering angle and a square of vehicle speed and an appropriately gained second product of change rate of the steering angle and a square of vehicle speed, such that the lateral distances are generally increased according to an increase of the sum when the sum is not larger than a threshold value and are generally decreased according to an increase of the sum when the sum is larger than the threshold value.

4. A device according to claim 2, wherein the calculating means further calculate lateral distances of the phantom side and angular shock absorbers of the front and rear halves of the phantom damping system according to forces acting across the front and rear shock absorbers, such that lateral distances are generally increased according to an increase of the forces up to respective saturation values.

5. A device according to claim 2, wherein the calculating means further calculate a slip angle and a change rate of the slip angle of the vehicle body, thereby discriminating a slipping state of the vehicle about at least an oversteering state, and further calculate modification factor for proportionally modifying a lateral distance of the phantom side and angular shock absorber of the front half of the phantom damping system according to the absolute value of the slip angle of the vehicle body and the slipping state, such that when the vehicle is in the oversteering state, the modification factor for the lateral distance of the front half of the phantom damping system is generally increased according to an increase of the absolute value of the slip angle.

6. A device according to claim 2, wherein the calculating means further calculate a slip angle and a change rate of the slip angle of the vehicle body, thereby discriminating a slipping state of the vehicle about at least an understeering state, and further calculate modification factor for proportionally modifying a lateral distance of the phantom side and angular shock absorbers of the rear half of the phantom damping system according to the absolute value of the slip angle of the vehicle body and the slipping state, such that, when the vehicle is in the understeering state, the modification factor for the lateral distance of the rear half of the phantom damping system is generally increased according to an increase of the absolute value of the slip angle.

7. A device according to claim 2, wherein the calculating means further calculate a slip angle and a change rate of the slip angle of the vehicle body, thereby discriminating a slipping state of the vehicle about at least a dissipating state, and further calculate modification factors for proportionally modifying lateral distances of the phantom side and angular shock absorbers of the front and rear halves of the phantom damping system according to the absolute value of the slip angle of the vehicle body and the slipping state, such that, when the vehicle is in the dissipating state, the modification factors for the lateral distances of the front and rear halves of the phantom damping system are magnified to be larger than 1 and are further generally increased according to an increase of the absolute value of the slip angle.

8. A device according to claim 2, wherein the calculating means calculate a basic value of the first phantom damping coefficient of the phantom side shock absorber of the front half of the phantom damping system based upon a mean value of vertical accelerations of the portions of the vehicle body corresponding to the front left and front right wheels by looking at a map prepared therefor, and a basic value of the first phantom damping coefficient of the phantom side shock absorber of the rear half of the phantom damping system based upon a mean value of vertical accelerations of the portions of the vehicle body corresponding to the rear left and rear right wheels by looking at a map prepared therefor, and a basic value of the second phantom damping coefficient of the phantom angular shock absorber of the front half of the phantom damping system based upon a rotational acceleration of a mass of a front portion of the vehicle body corresponding to the front left and front right wheels by looking at a map prepared therefor, and a basic value of the second phantom damping coefficient of the phantom angular shock absorber of the rear half of the phantom damping system based upon a rotational acceleration of a mass of a rear portion of the vehicle body corresponding to the rear left and rear right wheels by looking at a map prepared therefor.

9. A device according to claim 8, wherein the calculating means further calculate modification amounts for additively modifying the basic values of the first phantom damping coefficients of the front and rear halves of the phantom side shock absorbers according to a rate of throttle opening, such that the throttle opening rate dependent modification amounts for the front and rear halves are generally increased according to an increase of the throttle opening rate, the modification amount for the front half being more increased than the modification amount for the rear half.

10. A device according to claim 9, wherein the calculating means further calculate modification amounts for additively modifying the basic values of the second phantom damping coefficients of the front and rear halves of the phantom angular shock absorbers according to the throttle opening rate, such that the throttle opening rate dependent modification amounts for the front and rear halves are generally increased according to an increase of the throttle opening rate, the modification amount for the front half being more increased than the modification amount for the rear half.

11. A device according to claim 8, wherein the calculating means further calculate modification amounts for additively modifying the basic values of the first and second phantom damping coefficients and standard lateral distances of the front and rear halves of the phantom side and angular shock absorbers according to a deviation of a yaw rate of the vehicle from a standard yaw rate thereof theoretically calculatable from a steering angle and a vehicle speed, such that the yaw rate dependent modification amounts for the front and rear halves are generally increased in the absolute values thereof according to an increase in the absolute value of the yaw rate deviation, the sign of the yaw rate dependent modification amounts being dependent on the sign of the yaw rate deviation such that the signs of the yaw rate dependent modification amounts are reversed according to a reversal of the sign of the yaw rate deviation.

12. A device according to claim 8, wherein the calculating means further calculate modification factors for modifying shares of the first and second phantom damping coefficients and lateral distances of the front and rear halves of the phantom side and angular shock absorbers between the front and rear halves according to a rate of throttle opening, such that the throttle opening rate dependent modification factors for the front half are smaller as vehicle speed is higher and are generally decreased according to an increase of the throttle opening rate, the decrease being larger as the vehicle speed is higher, when the vehicle is a front drive vehicle.

13. A device according to claim 8, wherein the calculating means further calculate modification factors for modifying shares of the first and second phantom damping coefficients and lateral distances of the front and rear halves of the phantom side and angular shock absorbers between the front and rear halves according to a rate of throttle opening, such that the throttle opening rate dependent modification factors for the front half are larger as vehicle speed is higher and are generally increased according to an increase of the throttle opening rate, the increase being larger as the vehicle speed is higher, when the vehicle is a rear drive vehicle.

14. A device according to claim 8, wherein the calculating means further calculate modification factors for modifying shares of the first and second phantom damping coefficients and lateral distances of the front and rear halves of the phantom side and angular shock absorbers between the front and rear halves according to a brake stroke, such that the brake stroke dependent modification factors for the front half are generally increased according to an increase of the brake stroke, the increase being larger as the vehicle speed is higher, when the vehicle is an ordinary type vehicle.

15. A device according to claim 8, wherein the calculating means further calculate modification factors for modifying shares of the first and second phantom damping coefficients and lateral distances of the front and rear halves of the phantom side and angular shock absorbers between the front and rear halves according to a brake stroke, such that the brake stroke dependent modification factors for the front half are generally decreased according to an increase of the brake stroke, the decrease being larger as the vehicle speed is higher, when the vehicle is a sports type vehicle.

16. A device according to claim 8, wherein the calculating means further calculate modification amounts for additively modifying the basic values of the first phantom damping coefficients of the front and rear halves of the phantom side shock absorbers according to front and rear masses of the vehicle body corresponding to the front and rear wheels, such that the mass dependent modification amounts for the front and rear halves are generally increased according to an increase of the front and rear masses.

17. A device according to claim 16, wherein the calculating means further calculate modification amounts for additively modifying the basic values of the second phantom damping coefficients of the front and rear halves of the phantom angular shock absorbers according to the front and rear masses, such that the mass dependent modification amounts for the front and rear halves are generally increased according to an increase of the front and rear masses.

18. A device according to claim 8, wherein the calculating means further calculate modification factors for proportionally modifying the basic values of the first phantom damping coefficients of the front and rear halves of the phantom side shock absorbers according to vertically stroking velocities of front and rear portions of the vehicle body corresponding to the front and rear wheels, such that the vertically stroking velocity dependent modification factors for the front and rear halves are generally increased according to an increase of the vertically stroking velocities.

19. A device according to claim 18, wherein the calculating means further calculate modification factors for proportionally modifying the basic values of the second phantom damping coefficients of the front and rear halves of the phantom angular shock absorbers according to the vertically stroking velocities, such that the vertically stroking velocity dependent modification factors for the front and rear halves are generally increased according to an increase of the vertically stroking velocities.

20. A device according to claim 8, wherein the calculating means further calculate modification amounts for additively modifying the basic values of the first phantom damping coefficients of the front and rear halves of the phantom side shock absorbers according to front and rear flapping indexes indicating liabilities of the front and rear wheels to flap, such that the flapping index dependent modification amounts for the front and rear halves are generally increased according to an increase of the flapping indexes.

21. A device according to claim 20, wherein the calculating means further calculate modification amounts for additively modifying the basic values of the second phantom damping coefficients of the front and rear halves of the phantom angular shock absorbers according to the flapping indexes, such that the flapping index dependent modification amounts for the front and rear halves are generally increased according to an increase of the flapping indexes.

22. A device according to claim 8, wherein the calculating means further calculate modification amounts for additively modifying the basic values of the first phantom damping coefficients of the front and rear halves of the phantom side shock absorbers according to a brake stroke, such that the brake stroke dependent modification amounts for the front and rear halves are generally increased according to an increase of the brake stroke, the modification amount for the front half being more increased than the modification amount for the rear half.

23. A device according to claim 22, wherein the calculating means further calculate modification amounts for additively modifying the basic values of the second phantom damping coefficients of the front and rear halves of the phantom angular shock absorbers according to the brake stroke, such that the brake stroke dependent modification amounts for the front and rear halves are generally increased according to an increase of the brake stroke, the modification amount for the front half being more increased than the modification amount for the rear half.

24. A device according to claim 8, wherein the calculating means further calculate modification amounts for additively modifying the basic values of the first phantom damping coefficients of the front and rear halves of the phantom side shock absorbers according to front and rear swaying indexes indicating liabilities of front and rear portions of the vehicle body corresponding to the front and rear wheels to sway, such that the swaying index dependent modification amounts for the front and rear halves are generally increased according to an increase of the swaying indexes.

25. A device according to claim 24, wherein the calculating means further calculate modification amounts for additively modifying the basic values of the second phantom damping coefficients of the front and rear halves of the phantom angular shock absorbers according to the swaying indexes, such that the swaying index dependent modification amounts for the front and rear halves are generally increased according to an increase of the swaying indexes.

26. A device according to claim 25, wherein the calculating means further calculate modification amounts for additively modifying the basic values of the first phantom damping coefficients of the front and rear halves of the phantom side shock absorbers according to front and rear flapping indexes indicating liabilities of the front and rear wheels to flap, such that the flapping index dependent modification amounts for the front and rear halves are generally increased according to an increase of the flapping indexes, and modification amounts for additively modifying the basic values of the second phantom damping coefficients of the front and rear halves of the phantom angular shock absorbers according to the flapping indexes, such that the flapping index dependent modification amounts for the front and rear halves are generally increased according to an increase of the flapping indexes, and then further select either the swaying index dependent modification amounts or the flapping index dependent modification amounts which are larger than the other as a whole for additively modifying the basic values of the first and second phantom damping coefficients.

27. A device according to claim 26, wherein the calculating means further calculate modification amounts for subtractively modifying the basic values of the first phantom damping coefficients of the front and rear halves of the phantom side shock absorbers according to front and rear rattling indexes indicating liabilities of front and rear portions of the vehicle body corresponding to the front and rear wheels to rattle, such that the rattling index dependent modification amounts for the front and rear halves are generally increased in the absolute values thereof according to an increase of the rattling indexes, and modification amounts for subtractively modifying the basic values of the second phantom damping coefficients of the front and rear halves of the phantom angular shock absorbers according to the rattling indexes, such that the rattling index dependent modification amounts for the front and rear halves are generally increased in the absolute values thereof according to an increase of the rattling indexes, and then further select either the selected swaying index dependent or flapping index dependent modification amounts or the rattling index dependent modification amounts which are larger than the other as a whole in the absolute values thereof for additively or subtractively modifying the basic values of the first and second phantom damping coefficients.

28. A device according to claim 8, wherein the calculating means further calculate modification amounts for subtractively modifying the basic values of the first phantom damping coefficients of the front and rear halves of the phantom side shock absorbers according to front and rear rattling indexes indicating liabilities of front and rear portions of the vehicle body corresponding to the front and rear wheels to rattle, such that the rattling index dependent modification amounts for the front and rear halves are generally increased in the absolute values thereof according to an increase of the rattling indexes.

29. A device according to claim 28, wherein the calculating means further calculate modification amounts for subtractively modifying the basic values of the second phantom damping coefficients of the front and rear halves of the phantom angular shock absorbers according to the rattling indexes, such that the rattling index dependent modification amounts for the front and rear halves are generally increased in the absolute values thereof according to an increase of the rattling indexes.

30. A device according to claim 1, wherein the calculating means further calculate modification amounts for additively modifying the basic values of the first and second phantom damping coefficients the phantom side and angular shock absorbers when a maximum difference between leftward and rightward steering angles during a half of a cycle period of a consonant rolling of the vehicle body exceeds a threshold value predetermined therefor.

31. A device according to claim 1, wherein the calculating means further calculate modification amounts for additively modifying the basic values of the first and second phantom damping coefficients of the phantom side and angular shock absorbers when a maximum difference between leftward and rightward lateral accelerations of the vehicle body during a half of a cycle period of a consonant rolling of the vehicle body exceeds a threshold value predetermined therefor.

32. A device according to claim 1, wherein the calculating means further calculate modification amounts for additively modifying the basic values of the first and second phantom damping coefficients of the phantom side and angular shock absorbers when a maximum difference between clockwise and counter-clockwise rolling accelerations of the vehicle body as viewed from the back of the vehicle during a half of a cycle period of a consonant rolling of the vehicle body exceeds a threshold value predetermined therefor.

* * * * *